(12) United States Patent
Thomsen et al.

(10) Patent No.: US 11,739,931 B2
(45) Date of Patent: Aug. 29, 2023

(54) HEAT EXCHANGER, SUCH AS FOR A SOLAR POWER PLANT

(71) Applicant: Aalborg Csp A/S, Aalborg (DK)

(72) Inventors: Peter Thomsen, Aalborg (DK); Ivan Bo Christensen, Hobro (DK); Jens Taggart Pelle, Vadum (DK); Keld Sørensen, Skørping (DK); Peter Badstue Jensen, Aalborg SV (DK); Per Jørn Nielsen, Sulsted (DK); Svante Bundgaard, Aalborg (DK)

(73) Assignee: HEADER-COIL COMPANY A/S, Aalborg (DK)

( * ) Notice: Subject to any disclaimer, the term of this patent is extended or adjusted under 35 U.S.C. 154(b) by 96 days.

(21) Appl. No.: 17/280,396

(22) PCT Filed: Sep. 23, 2019

(86) PCT No.: PCT/DK2019/050278
§ 371 (c)(1),
(2) Date: Mar. 26, 2021

(87) PCT Pub. No.: WO2020/069704
PCT Pub. Date: Apr. 9, 2020

(65) Prior Publication Data
US 2021/0381687 A1     Dec. 9, 2021

(30) Foreign Application Priority Data

Oct. 1, 2018 (DK) .............................. PA201870639
Jun. 17, 2019 (DK) .............................. PA201970375

(51) Int. Cl.
*F22B 1/00* (2006.01)
*F22B 1/16* (2006.01)
(Continued)

(52) U.S. Cl.
CPC ................ *F22B 1/006* (2013.01); *F22B 1/16* (2013.01); *F22B 29/06* (2013.01); *F22B 37/12* (2013.01);
(Continued)

(58) Field of Classification Search
CPC .. F22B 1/006; F22B 1/021; F22B 1/16; F22B 29/06; F22B 37/12; F28D 1/0472;
(Continued)

(56) References Cited

U.S. PATENT DOCUMENTS 3,768,554 A    10/1973  Stahl
4,246,872 A     1/1981  Skinner et al.
(Continued)

FOREIGN PATENT DOCUMENTS

CN    101876299 A    11/2010
CN    102667338 A     9/2012
(Continued)

OTHER PUBLICATIONS

DE 102010028681 A1 Translation (Year: 2011).*
(Continued)

*Primary Examiner* — Steven B McAllister
*Assistant Examiner* — Benjamin W Johnson
(74) *Attorney, Agent, or Firm* — Crowell & Moring LLP; John C. Freeman

(57) ABSTRACT

A heat exchanger (10) to provide heat exchange between fluids (24, 25), such as in a solar power plant (1), may include a first and second pipe connectors (13, 14), and a pipe bundle (17) extending between the first and second pipe connectors, with pipes (17a-17n) of the pipe bundle configured to guide a second fluid (25). The pipe bundle may be connected to the first and second pipe connectors at pipe connection points (16) so the inside of the pipes (17a-17n) is in fluid communication with cavities (15) of those con-
(Continued)

Figure 1:
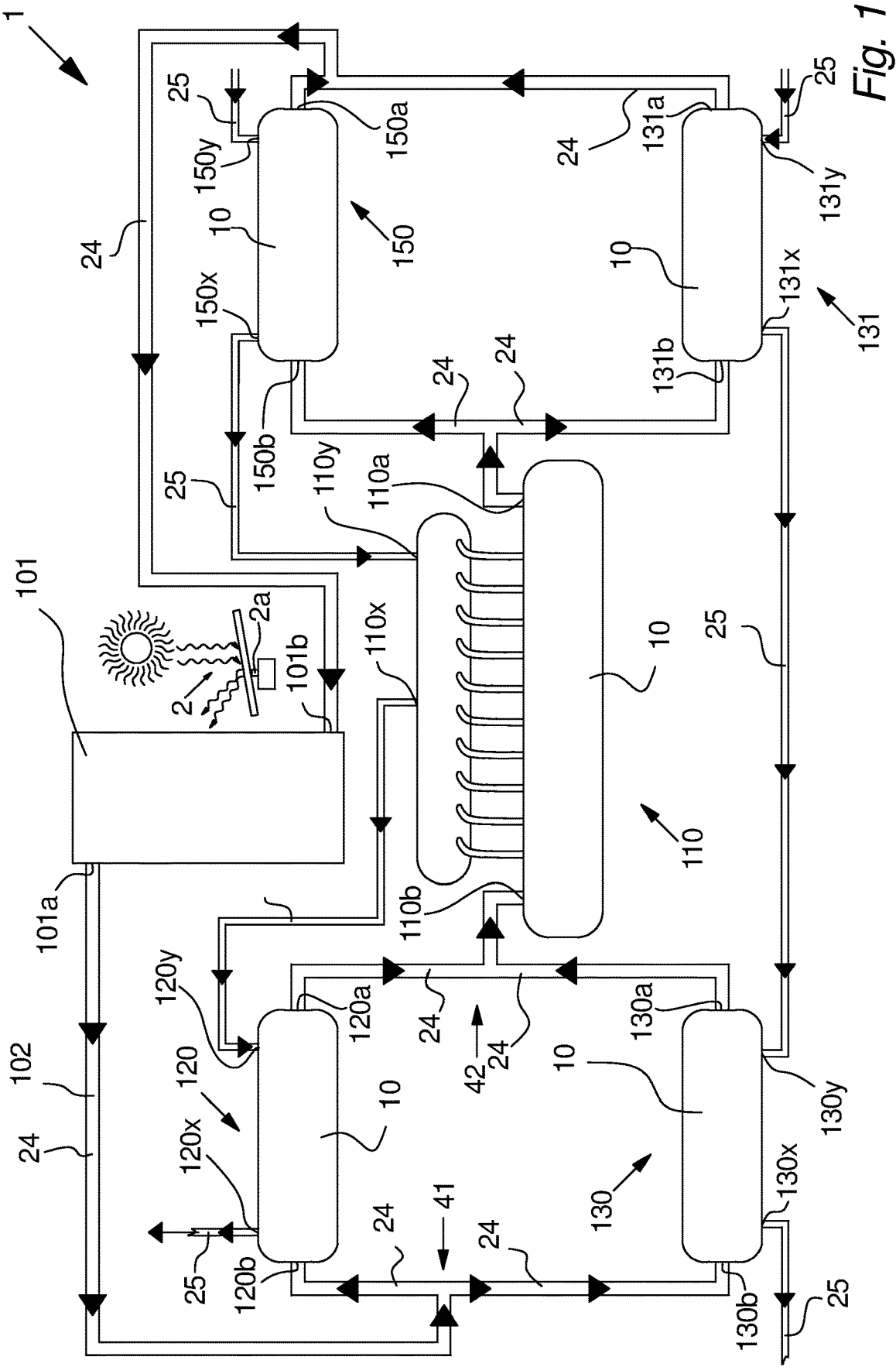

nectors. The pipes may be arranged adjacent each other and extending together between the pipe connectors in a meandering manner providing a plurality of crests (20a, 20b) on the pipes between the pipe connectors, so that crests of the pipes are arranged to extend into recesses provided by one or more crests on other pipes of the pipe bundle.

19 Claims, 15 Drawing Sheets

(51) Int. Cl.
*F22B 29/06* (2006.01)
*F22B 37/12* (2006.01)
*F28D 1/047* (2006.01)
*F28D 20/00* (2006.01)
*F22B 1/02* (2006.01)
*F28D 7/08* (2006.01)

(52) U.S. Cl.
CPC ............ *F22B 1/021* (2013.01); *F28D 1/0472* (2013.01); *F28D 1/0477* (2013.01); *F28D 7/082* (2013.01); *F28D 7/087* (2013.01); *F28D 20/0034* (2013.01); *F28D 2020/0047* (2013.01); *Y02E 60/14* (2013.01); *Y02E 70/30* (2013.01)

(58) Field of Classification Search
CPC ........ F28D 1/0477; F28D 7/082; F28D 7/087; F28D 20/0034; F28D 2020/0047; Y02E 60/14; Y02E 70/30
USPC ......................................................... 126/714
See application file for complete search history.

(56) References Cited

U.S. PATENT DOCUMENTS

| | | |
|---|---|---|
| 2004/0149239 A1 | 8/2004 | Franke et al. |
| 2010/0059216 A1 | 3/2010 | Bruckmann et al. |
| 2012/0111288 A1 | 5/2012 | Malavasi et al. |
| 2013/0112156 A1 | 5/2013 | Band et al. |
| 2013/0118419 A1 | 5/2013 | Stahlhut et al. |
| 2013/0186089 A1 | 7/2013 | Brückner et al. |
| 2014/0027099 A1 | 1/2014 | Sispera et al. |
| 2014/0190664 A1 | 7/2014 | Rizzonelli |
| 2016/0054076 A1* | 2/2016 | Krell .................... F28F 21/067 165/172 |
| 2016/0370030 A1* | 12/2016 | Zala ....................... F24H 1/285 |
| 2020/0096191 A1* | 3/2020 | Manenti ................ F22B 1/1884 |

FOREIGN PATENT DOCUMENTS

| | | | | |
|---|---|---|---|---|
| CN | 103189603 A | | 7/2013 | |
| DE | 10 2010 028681 A1 | | 10/2011 | |
| DE | 102010028681 A1 | * | 11/2011 | ............. F03G 6/067 |
| DE | 10 2010 041903 A1 | | 5/2012 | |
| EP | 0228722 A2 | | 7/1987 | |
| EP | 2 278 220 A1 | | 1/2011 | |
| EP | 2 322 854 B1 | | 4/2013 | |
| EP | 22 78 220 B1 | | 5/2014 | |
| GB | 2 049 148 A1 | | 12/1980 | |
| WO | WO 2011/104325 A2 | | 1/2011 | |
| WO | WO 2011/091885 A2 | | 4/2011 | |
| WO | WO 2011/138213 A2 | | 10/2011 | |

OTHER PUBLICATIONS

PCT/DK2019/050278 International Search Report (4 pages) dated Jan. 7, 2020.
PCT/DK2019/050278 Written Opinion of the International Searching Authority (7 pages) dated Jan. 7, 2020.
PCT/DK2019/050278 International Preliminary Report on Patentability (8 pages) dated Mar. 23, 2021.
First Office Action dated Sep. 20, 2022 out of corresponding Chinese Patent Application 2019800709625 (8 pages including English translation).
Shang Shaowen et al., "Heat Ventilation Air-Conditioning Technology" published by Northeast University, pp. 134-135; Dec. 31, 2017 (4 total pages).

* cited by examiner

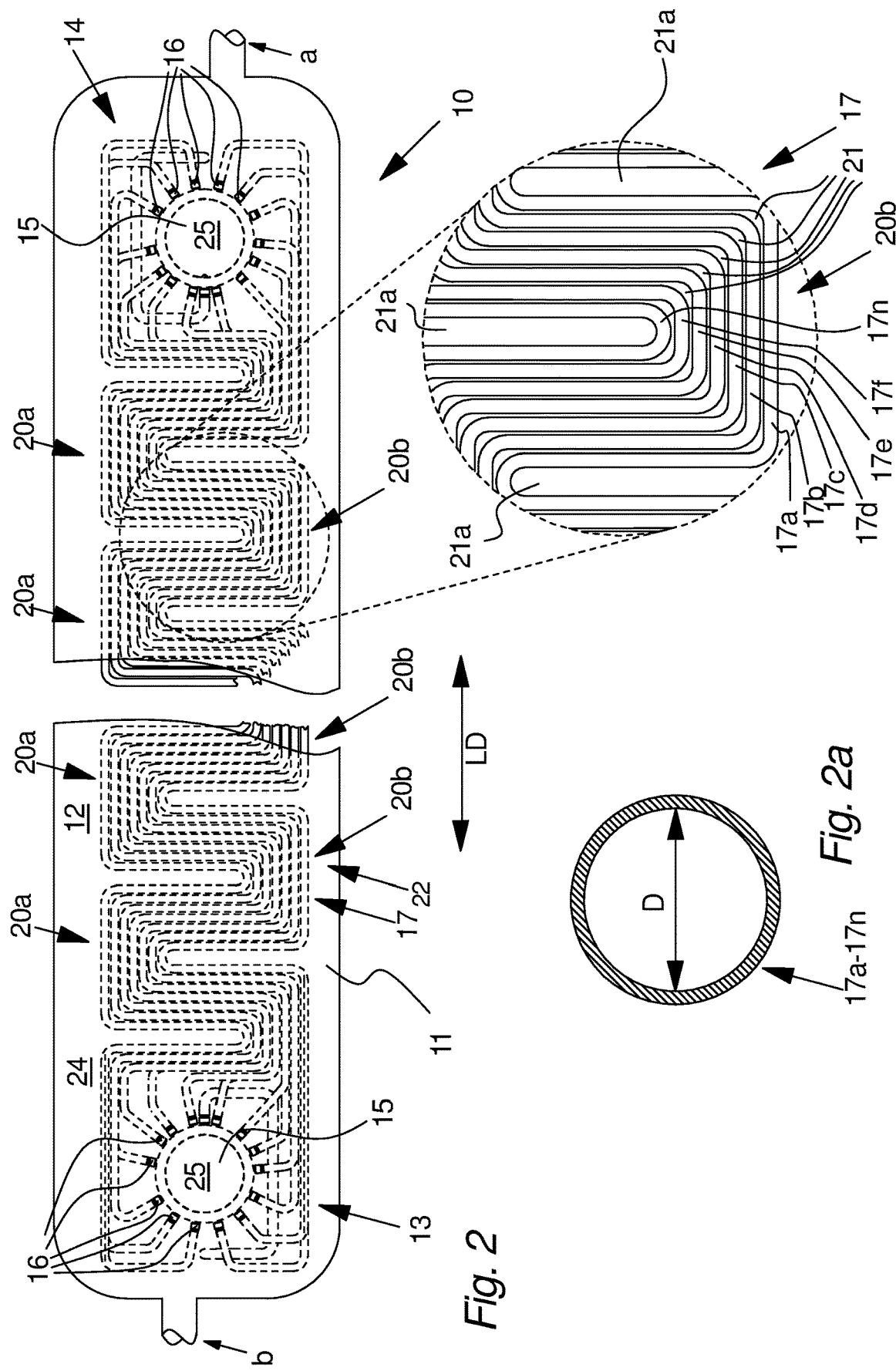

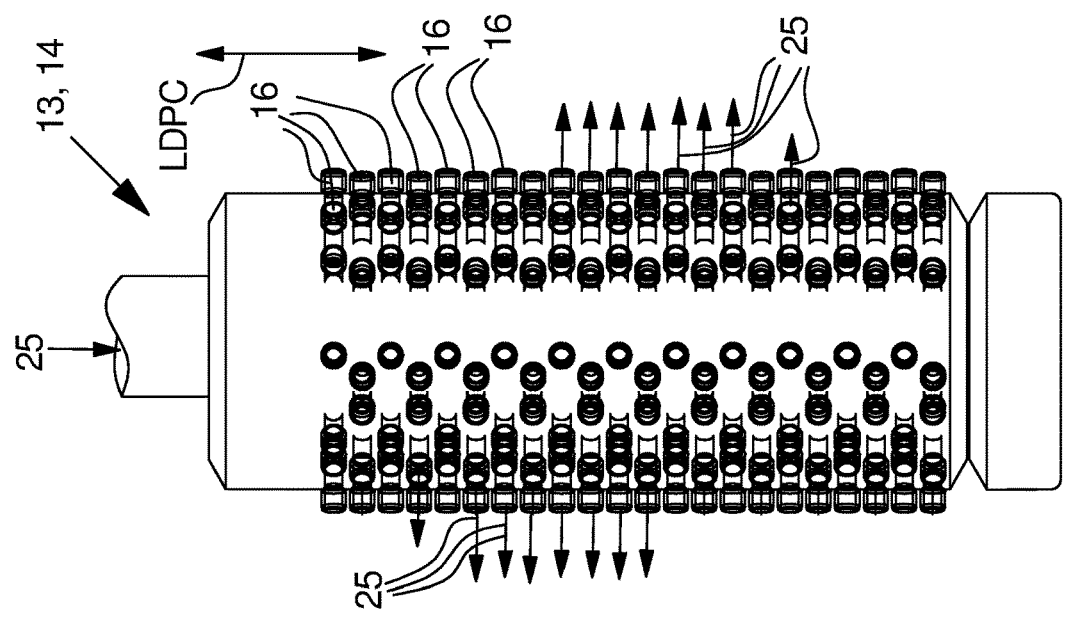
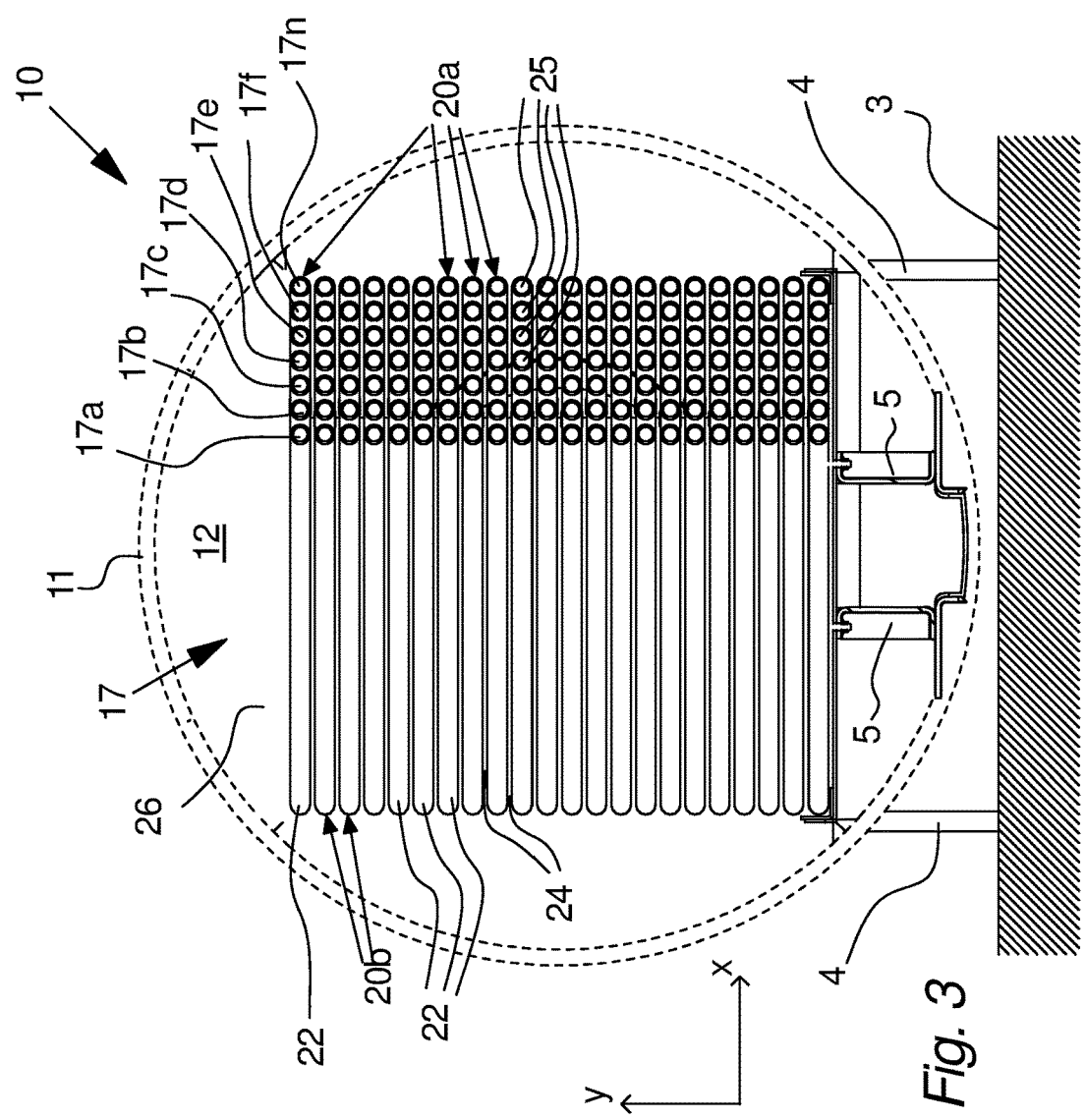

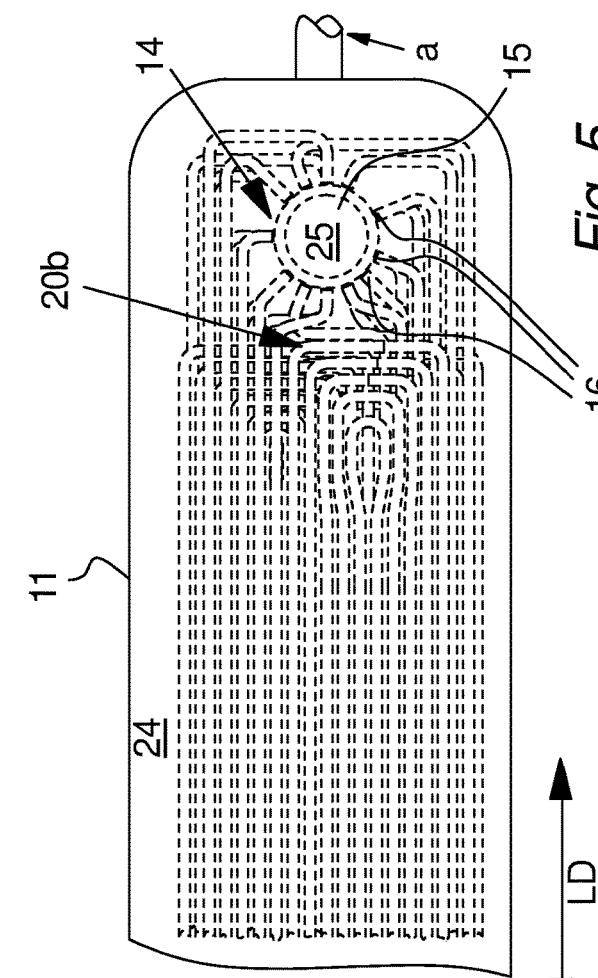
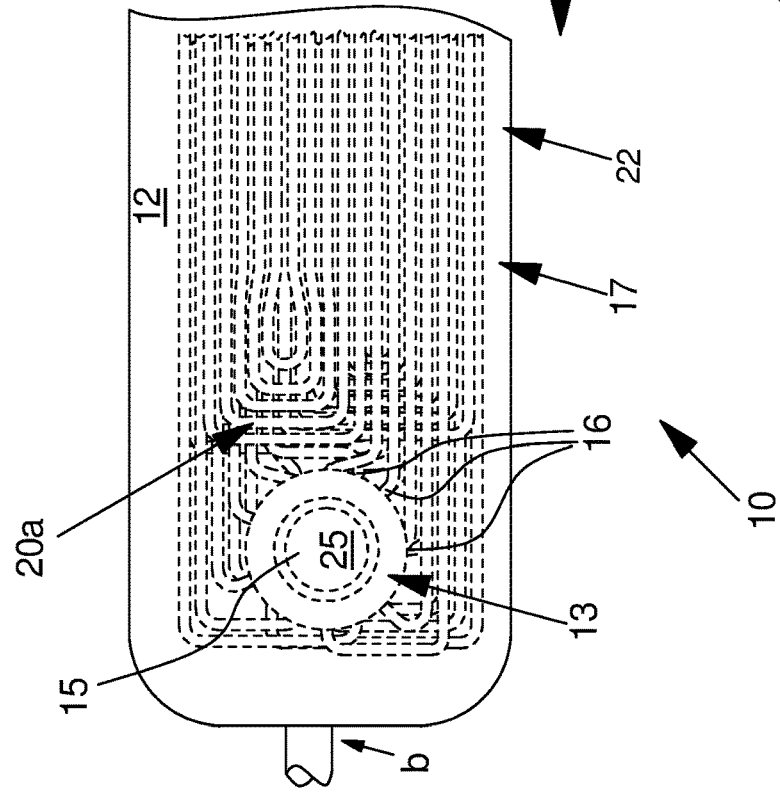
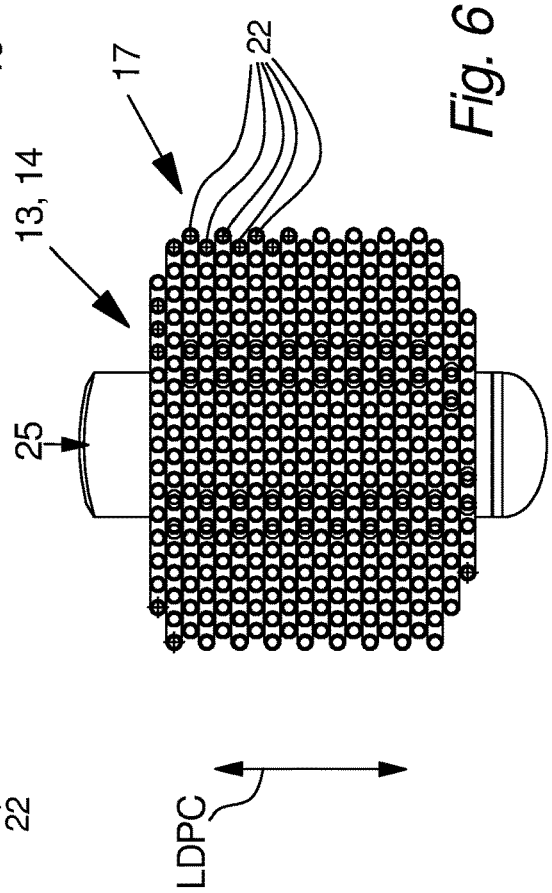
Fig. 5
Fig. 6

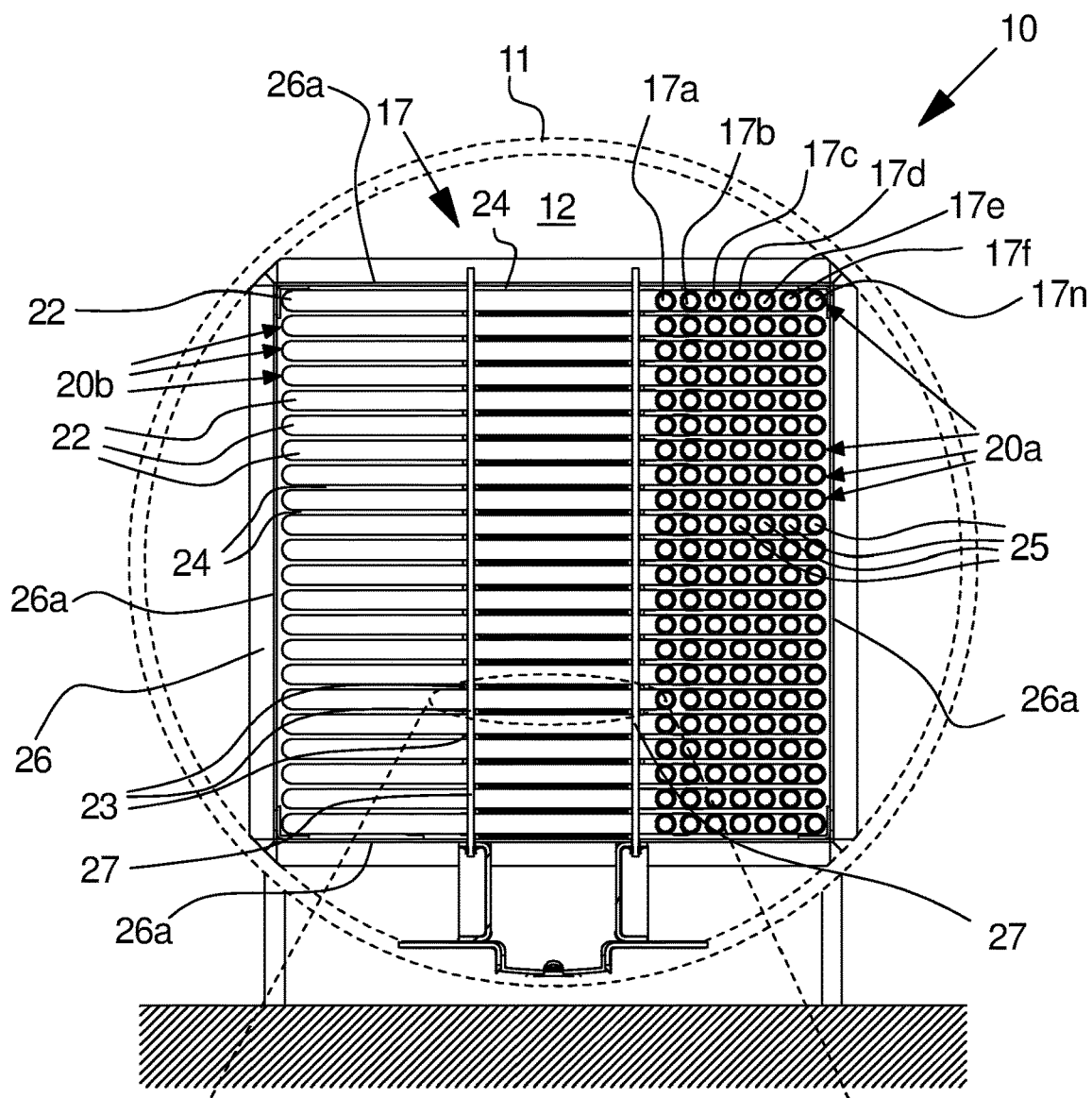
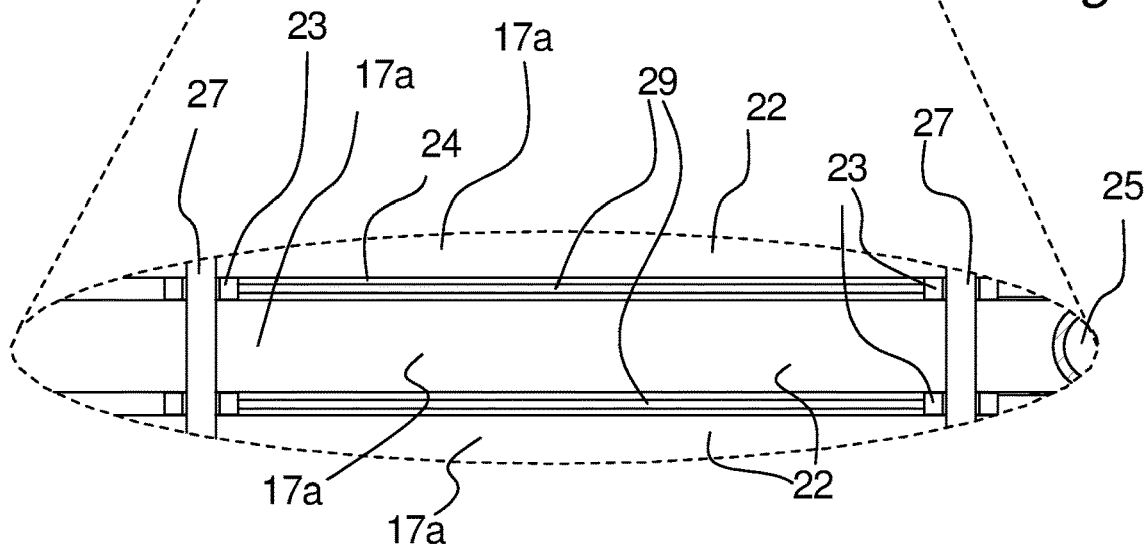
Fig. 8

HEAT EXCHANGER, SUCH AS FOR A SOLAR POWER PLANT

PRIORITY CLAIM WITH REFERENCE TO RELATED APPLICATIONS

This application claims the benefit under 35 U.S.C. § 371 of International Application No. PCT/DK2019/050278, filed Sep. 23, 2019, which claims the benefit of Danish Patent Application Nos. PA201870639, filed Oct. 1, 2018, and PA201970375, filed Jun. 17, 2019, each of which is incorporated by reference herein in its entirety.

BACKGROUND

Large solar power plants for generating electric power for the utility grid have become more and more efficient the recent years, and also more popular as a renewable energy solution.

Such solar power plants normally comprises a plurality of heliostats, parabolic trough or linear Fresnel in the following mentioned as solar absorbers controlled to keep reflecting sunlight toward a heating unit arranged to be heated by the sun, so that the heliostats compensates for the sun's apparent motions in the sky.

The heating unit heats a fluid, such as molten salt or thermal oil, which is guided through various heat exchangers by a piping system in order to transfer heat to water and/or steam. The steam enters a steam turbine coupled to a generator configured to generate electric power, preferably for the utility grid.

The solar power plants may be arranged to generate between 10 MW and 1000 MW of electric power, such as between 25 MW and 800 MW of electric power dependent on the capacity of the solar power plant and/or the amount of energy in the sun light.

The heat exchangers of the solar power plant for generating steam and/or heating water in liquid state may comprise pipe bundles for containing the water/steam or the molten salt or thermal oil. EP 22 78 220 B1 and EP 2 322 854 B1 discloses examples of a heat exchanger for a solar power plant comprising tubes/pipes in an outer casing.

The present disclosure may e.g. provide one or more solutions which may improve the efficiency/coefficient of utilization of heat exchangers for solar power plants as e.g. described above. The present disclosure may moreover or alternatively help to improve a solar power plant to e.g. make the plant more cost efficient and/or energy efficient.

SUMMARY

The present invention relates to a heat exchanger for providing heat exchange between fluids, such as in a solar power plant or another system such as in other suitable types of industrial applications. Said heat exchanger comprises
  a container, wherein said container is configured to house a first fluid
  a first pipe connector and a second pipe connector, each pipe connector comprising a cavity, wherein each of the first and second pipe connectors comprises a plurality of pipe connection points distributed at the pipe connectors, and
  a pipe bundle arranged inside said container and extending between the first and second pipe connectors, wherein said pipes of the pipe bundle are configured to guide a second fluid,
  wherein said pipe bundle in the container is connected to the first and second pipe connectors at the pipe connection points so the inside of the pipes of the pipe bundle is in fluid communication with the cavities of the first and second pipe connector,
  wherein said heat exchanger is configured to provide a heat transfer between the first fluid and second fluid through the pipe walls of the pipes of the pipe bundle,
  wherein pipes of the pipe bundle are arranged next to each other and extend together between the pipe connectors in a meandering manner providing a plurality of crests on the pipes between the pipe connectors, and so that crests of pipes of the pipe bundle are arranged to extend into recesses provided by one or more crests on other pipes of the pipe bundle.

Preferably, said crests of the pipes of the pipe bundle are substantially coinciding, The pipes of the pipe bindle are preferably arranged so that the first fluid can completely surround said pipes of the pipe bundle inside the container and flow through the container from the inlet to the outlet of the container.

The first fluid is preferably thermal oil or a molten salt, and said second fluid is in that case preferably water or steam.

The water or steam may normally be pressurized to a pressure between 10 bar and 220 bar dependent on where in the system, such as a solar power plant, the heat exchanger is located/placed. For example, if the heat exchanger is a super heater, the output steam may be at a pressure between 10 bar and 220 bar, such as around 12-200 bar, and having a temperature between 160° C. and 600° C. such as around 180° C. to 570° C. This provides very high demands to the strength of the wall of the container, and thus a very thick metal/steel wall of the container. This issue may be reduced by distributing the steam/water in the pipes of the pipe bundle, as the fluid to transfer heat to the water/steam through the walls of the pipes of the pipe bundle may be substantially at atmospheric pressure. If the heat exchanger is another heat exchanger in the solar power system, the pressure and/or temperature of the steam (or in some situations water in liquid form/state) may be different from the above mentioned.

It may be preferred that the fluid in the pipes of the pipe bundle is steam or water, as In other embodiments of the invention, the first fluid may be water or steam to be heated by the second fluid in the pipes of the pipe bundle, which may e.g. be thermal oil or molten salt (when in operation).

In preferred aspects of the invention, one of the first and second fluid is thermal oil or a molten salt, and the other of the first and second fluid wherein said second fluid is water or steam.

The pipe bundle may preferably comprise a plurality of layers of pipes distributed in a direction transverse to a longitudinal direction of the container, where each of said plurality of pipe layers comprises pipes extending in said meandering manner.

The layers are preferably substantially parallel, and may preferably be arranged to extend in different, layered, substantially horizontal planes in the container.

The pipe layers are preferably substantially similar, so that the pipes of the bundle have substantially the same length, and preferably so that they form coinciding inner crests.

The pipe bundle preferably has a substantially rectangular cross sectional shape in a transverse plane perpendicular to the longitudinal direction of the container.

The pipe bundle may advantageously be arranged inside a flow guiding enclosure in the container, wherein the flow guiding enclosure extends in the longitudinal direction of the container.

The flow guiding enclosure preferably comprises walls for guiding a fluid flow of the first fluid over the pipe bundle, such as from an inlet to an outlet of the container. The flow guiding structure preferably has a rectangular cross sectional shape in a transverse plane perpendicular to the longitudinal direction (LD) of the container The crests on the pipes extend preferably in a direction transverse to the longitudinal direction of the container.

The heat exchanger may comprise flow-guiding elements extending into inner recesses provided by one or more crests of the pipe bundle.

The flow guiding elements may preferably be baffles, preferably in the form of flow-directing and/or obstructing vanes or panels/plates.

The flow guiding elements may improve the heat transfer between the fluid in the container, and the fluid inside the pipe bundle, as they may force the fluid in the container to travel a longer way than the length between the pipe connectors, hereby increasing the heat transfer.

Moreover, the flow guiding elements may provide an improved flow stream in a transverse to pipes of the pipe bundle between oppositely directed crests, thereby helping to further improve the heat transfer, e.g. caused by vortexes generated by the flow guiding elements.

The flow guiding elements may extend into inner recesses provided by one or more crests of the pipe bundle of a plurality of layers of pipes of the pipe bundle.

In particular, the heat exchanger may preferably comprise a plurality of said flow guiding elements, arranged to extend into inner recesses provided by the one or more crests of the pipe bundle from opposite sides of the pipe bundle.

The flow guiding elements may in particular comprise plates configured to extend in a transverse plane substantially perpendicular to the longitudinal direction of the container.

The flow guiding elements are preferably fixed to said flow-guiding enclosure, such as fixed to inner wall surfaces of the flow guiding enclosure.

Flow guiding elements, such as plates may in addition to providing an improved flow of the first fluid over the surfaces of the pipes of the pipe bundle, at the same time provide a strengthening functionality Alternatively, the flow guiding elements may be connected to e.g. an inner wall of the container, to another frame structure than a flow guiding enclosure in the container and/or the like.

A flow space for the first fluid may be provided between an edge of the flow guiding elements proximate the inner bended surface of the pipe(s) providing the inner recesses.

The heat exchanger may further comprise a plurality of pipe distancing elements, such as rods, extending in the longitudinal direction of the container between pipe layers of the pipe bundle, wherein the heat exchanger comprises one or more vortex generating elements arranged to extend from said pipe distancing elements between adjacent pipe layers of said pipe bundle, preferably in a direction transverse to the longitudinal direction of the heat exchanger.

The vortex generating elements extend advantageously between pipe distancing elements arranged between adjacent pipe layers.

Preferably, a plurality of said vortex generating elements are arranged in a space between adjacent layers of pipes of said pipe bundle.

The vortex generating elements are arranged to generate vortexes in the flow of the fluid in the container between the pipe layers to enhance the heat transition between the fluid in the container and the fluid in the pipes of the pipe bundle.

The pipe distancing elements are arranged to maintain a minimum distance between the layers of pipes in the pipe bundle.

The vortex generating elements may n particular comprise longitudinal members, such as rods, arranged to extend in a direction transverse to the longitudinal direction of the container.

The heat exchanger may comprise a plurality of said vortex generating elements, wherein the pipe distancing elements and the vortex generating elements together form a ladder structure in a space between adjacent layers of pipes of the pipe bundle.

The heat exchanger may in particular comprise a plurality of said vortex generating elements distributed in the longitudinal direction of the heat exchanger, and distributed between different layers of pipes of the pipe bundle.

The heat exchanger may comprise a group of said vortex generating elements distributed in the same space in the longitudinal direction of the heat exchanger between two adjacent layers of pipes of the pipe bundle, wherein said group comprises at least two, preferably at least five such as at least ten of said turbulence generating elements.

Different spaces between different, adjacent pipe layers may each comprise a plurality of said vortex generating elements.

The pipe distancing elements are preferably kept in place by means of a distancing element support arrangement, wherein the distancing element support arrangement preferably support on a bottom part of the flow guiding enclosure and/or a bottom part of the container.

The distancing element support arrangement preferably comprises one or more rods arranged to at least prevent the pipe distancing elements from sliding between the pipe layers, e.g. by extending through and/or connected/fixed to the pipe distancing elements The pipes of the pipe bundle of the heat exchanger are preferably of an inner diameter between 13 mm and 38 mm.

The heat exchanger may constitute a part of an evaporator unit configured to generate steam from the first or second fluid by providing a phase transition of the first or second fluid, in particular wherein said evaporator unit comprises one or more of said heat exchangers, and a further steam container, wherein the steam container is in fluid communication with the heat exchangers of the evaporator unit to supply water to the heat exchangers, wherein the evaporator unit comprises an inlet for water, wherein the evaporator unit comprises a riser arrangement configured so that steam and/or water supplied to the evaporator unit and evaporated in the heat exchangers of the evaporator unit is circulated to the steam container, wherein the steam container comprises a steam outlet, and wherein the steam container preferably comprises a separation arrangement for separating liquid from steam before the steam enter the outlet.

The heat exchanger may be used as a super heater for further heating steam received through an inlet of the super heater, where the steam is preferably received from an evaporator unit.

The heat exchanger may alternatively be used as a re-heater arranged between an outlet of a steam turbine and before the fluid is reintroduced to the steam turbine a second time before it is condensed by a condensing unit.

The heat exchanger may be used as a fluid/fluid heat exchanger to provide heat transfer between thermal oil and molten salt. In particular, the heat exchanger may be utilized in two operating modes comprising A first operating mode where heat exchange is provided from thermal oil to molten salt by means of the heat exchanger so as to provide heat transfer to molten salt received from a second molten salt storage while moving the molten salt to a first molten salt storage and A second operating mode wherein molten salt transfer stored heat energy from the first molten salt storage to the thermal oil to be used in a steam generating system.

The pipe bundle of the heat exchanger of the present invention may in a particular embodiment comprise a plurality of layers of pipes distributed in a direction transverse to a longitudinal direction of the container, the layers of pipes extending substantially in parallel, where each of said plurality of pipe layers comprises a plurality of pipes extending in said meandering manner, wherein the layers of pipes are of different width in a direction transverse to a longitudinal direction of the container and layers of smaller width comprises fewer pipes than layers of larger width.

Hereby it is obtained that the although the transversal flow distance inside the pipes of the layers of smaller width is made shorter, this is counteracted by the smaller number of pipes in those layers as compared to layers of larger width, whereby each pipe will have a larger number of crests than pipes in layers of larger width and the overall flow resistance inside each pipe of the heat exchanger will be of a comparable magnitude, resulting in substantially the same heat exchange between the first fluid and the second fluid regardless of which layer the pipe is a part of. By doing so, the pipe bundle inside the container can be adapted to fit the cross sectional shape of the container and thereby fill out the cross sectional area of the container to a higher degree, leading to an improved utilization of the volume of the container as compared to a pipe bundle arranged in layers of equal width.

The width of the layers of pipes may in particular be adapted to the cross sectional shape of the container so that the inner volume of the container is utilized by the pipe bundle to a higher degree than possible with layers of equal width.

The container has preferably a substantially circular cross sectional shape, which is advantageous for pressurised containers.

The width of the layer of pipes of the smallest width is preferably 80% or less than the width of the layer of pipes of the largest width, preferably 70% or less.

The number of pipes of the layer of pipes of the smallest width is preferably 80% or less than the number of pipes of the layer of pipes of the largest width, preferably 70% or less.

The present disclosure additionally relates to use of a heat exchanger for providing above 5 MW thermal power, such as above 10 MW thermal power, for example above 20 MW thermal power or above 25 MW thermal power. Additionally, said use may in further aspects be provided so that the heat exchanger provides no more than 600 MW thermal power, such as no more than 300 MW thermal power, for example no more than 200 MW thermal power or no more than 120 MW thermal power. The present disclosure moreover relates to use of a heat exchanger in a solar power plant and/or for providing industrial heat.

FIGURES

Figure 1A:
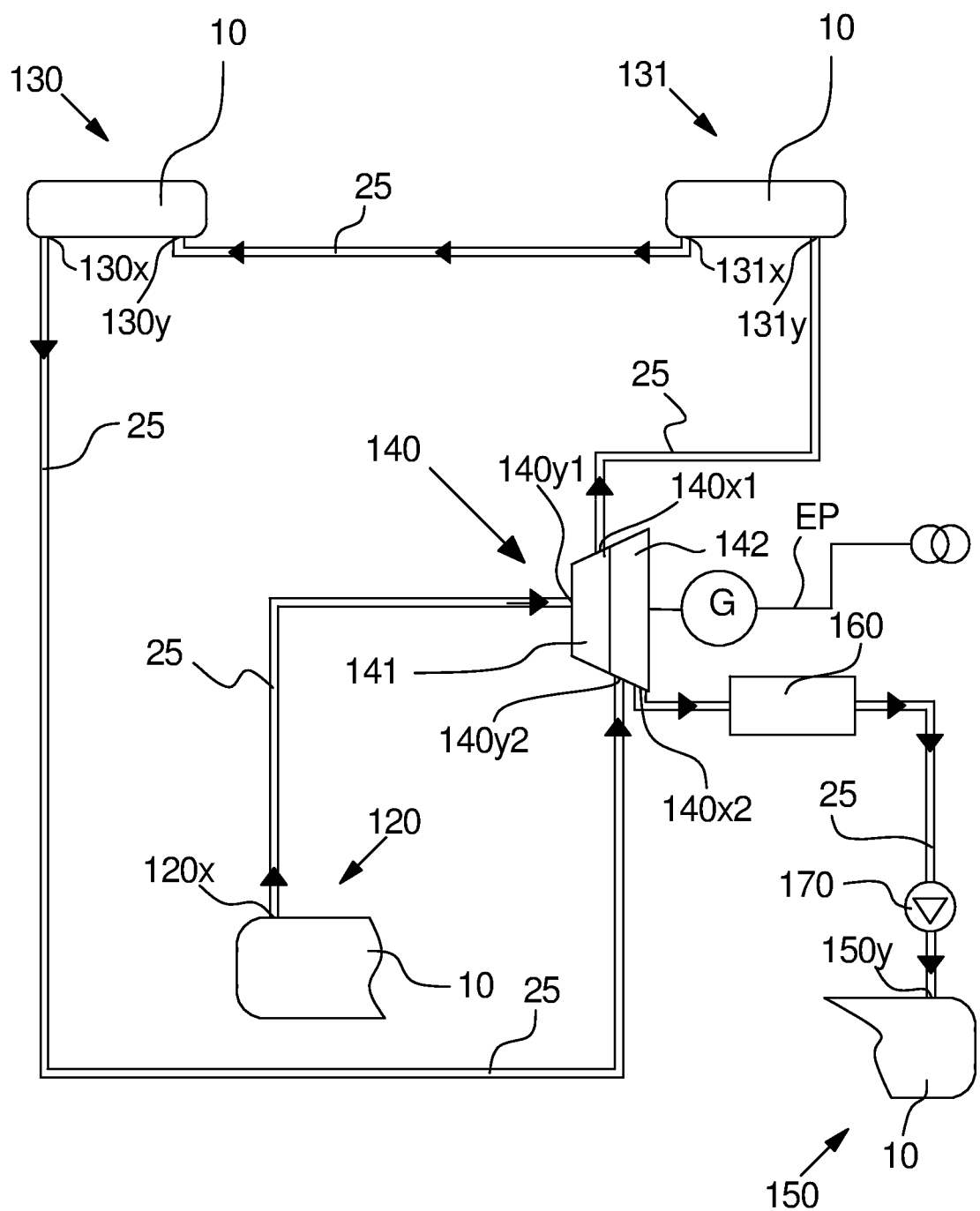
Figure 7:
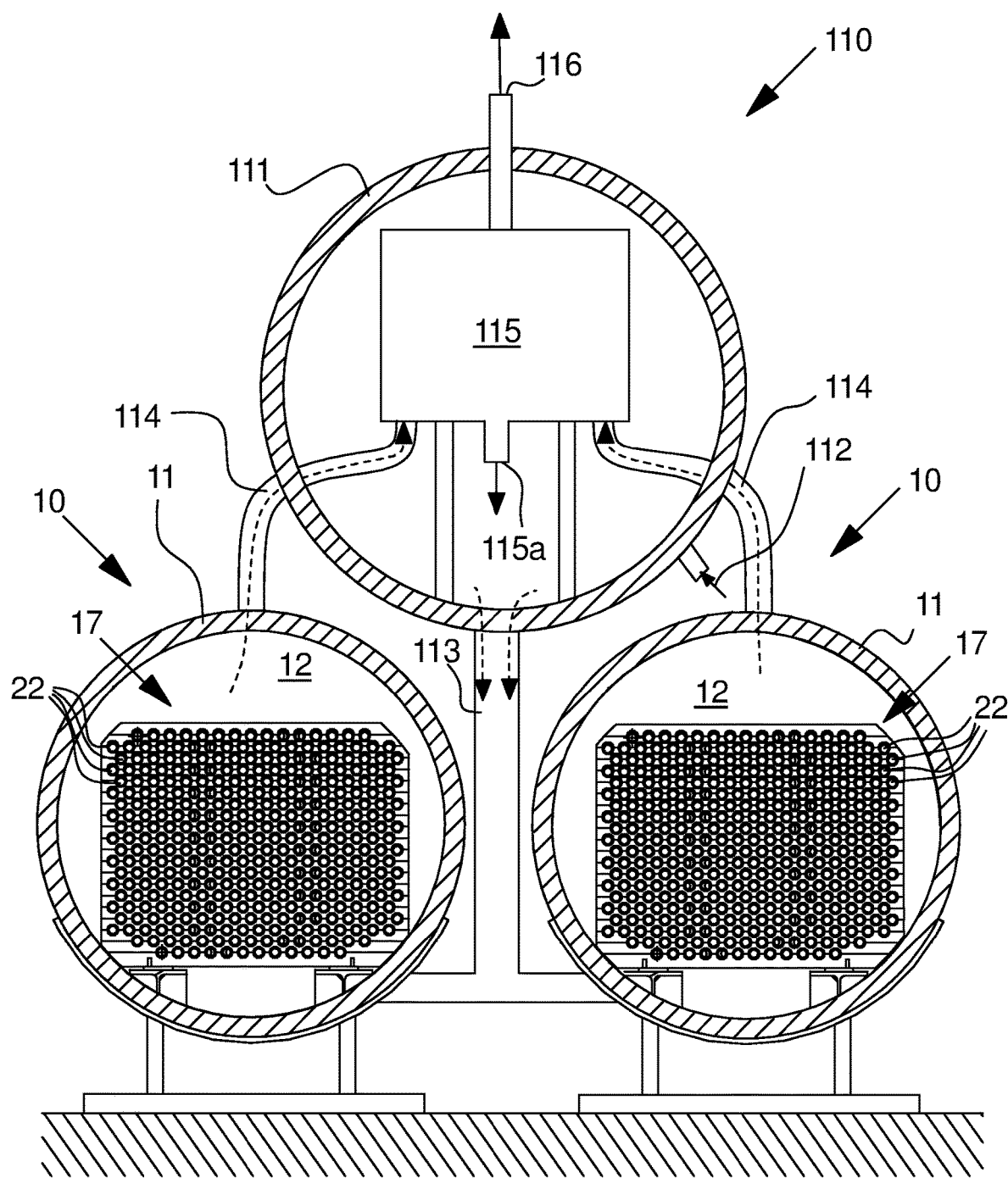
Figure 9:
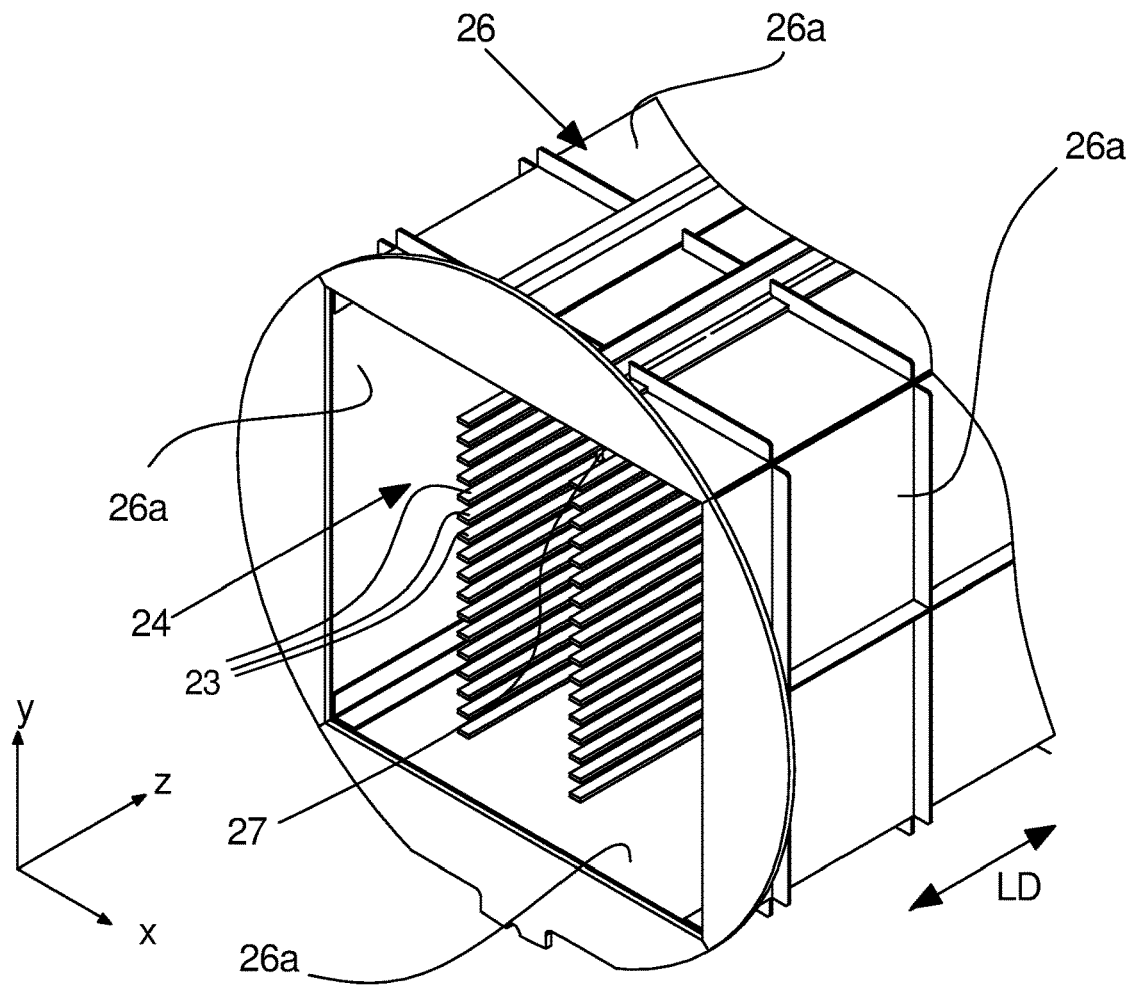
Figure 10:
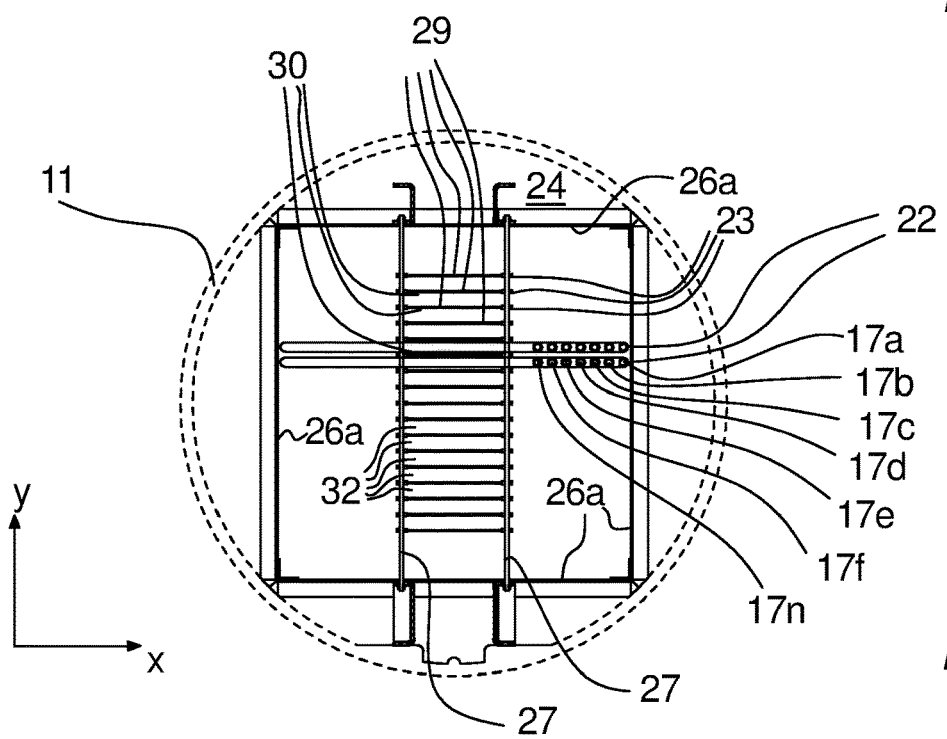
Figure 11A:
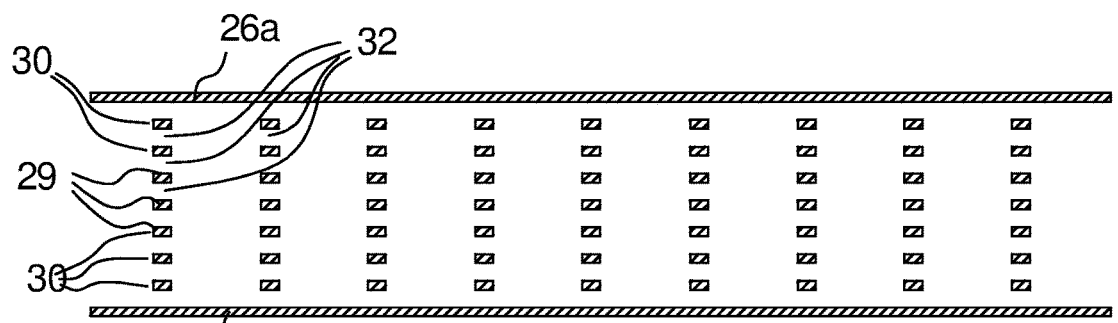
Figure 11B:
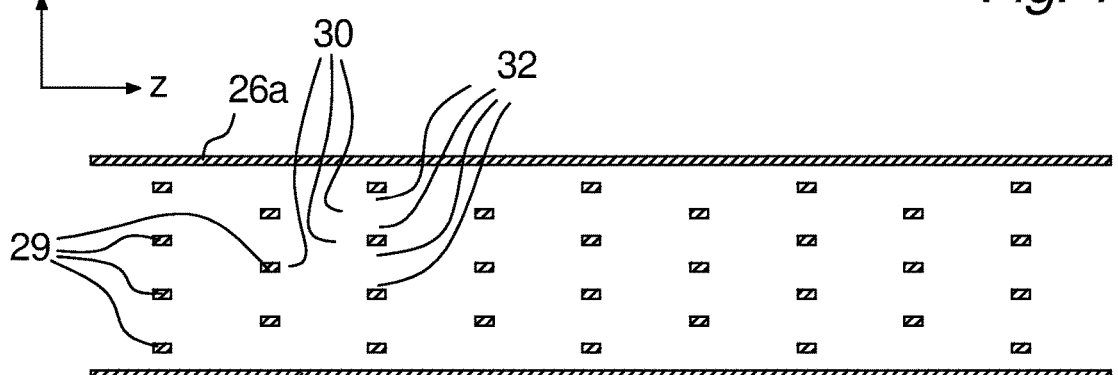
Figure 11C:
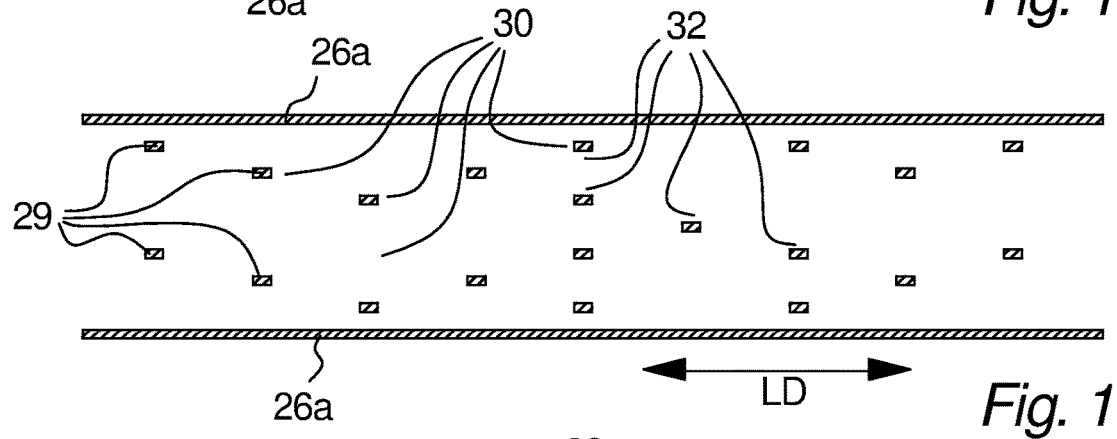
Figure 11D:
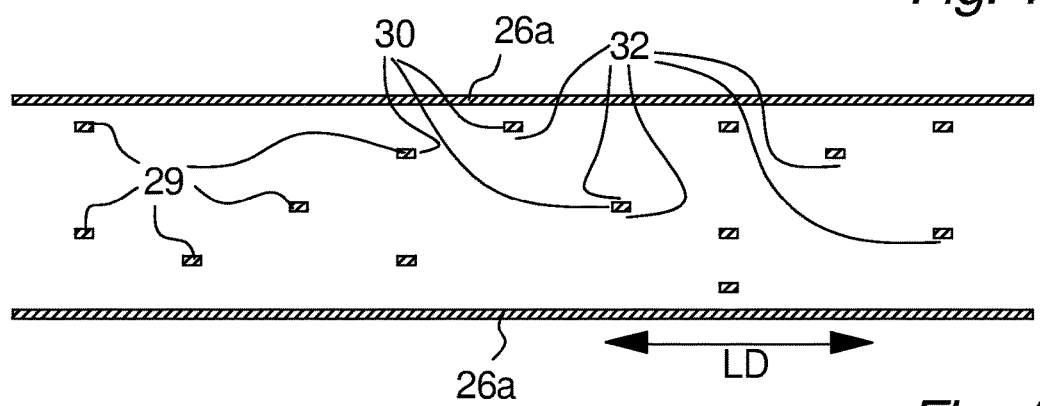
Figure 12:
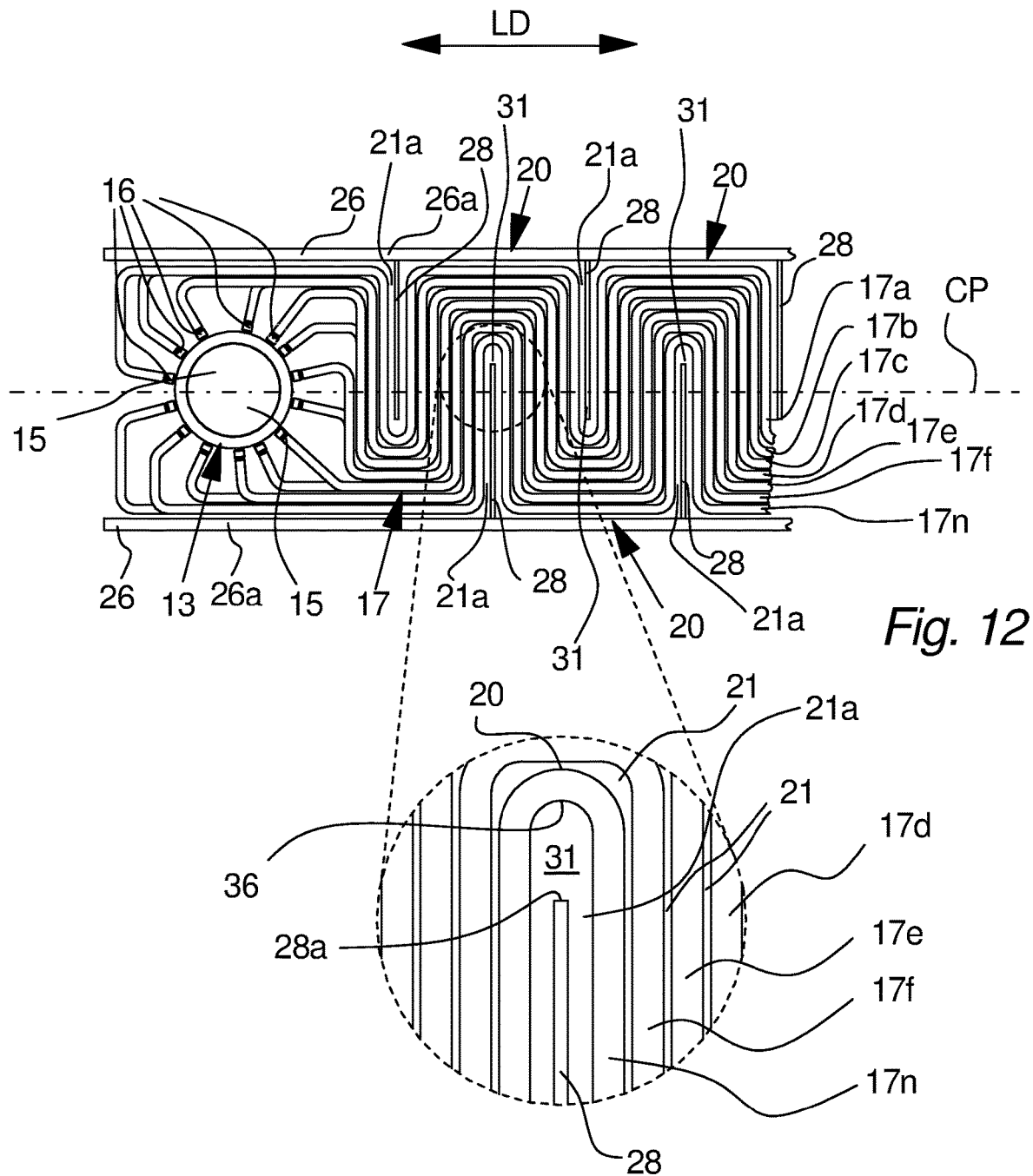
Figure 13:
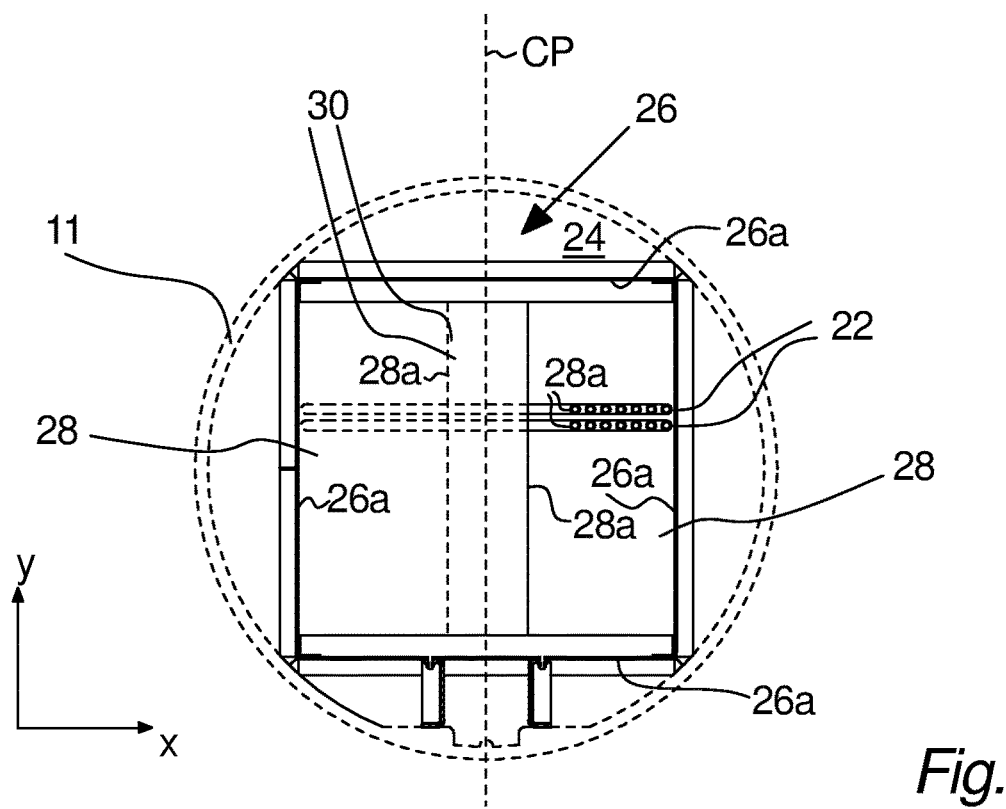
Figure 14:
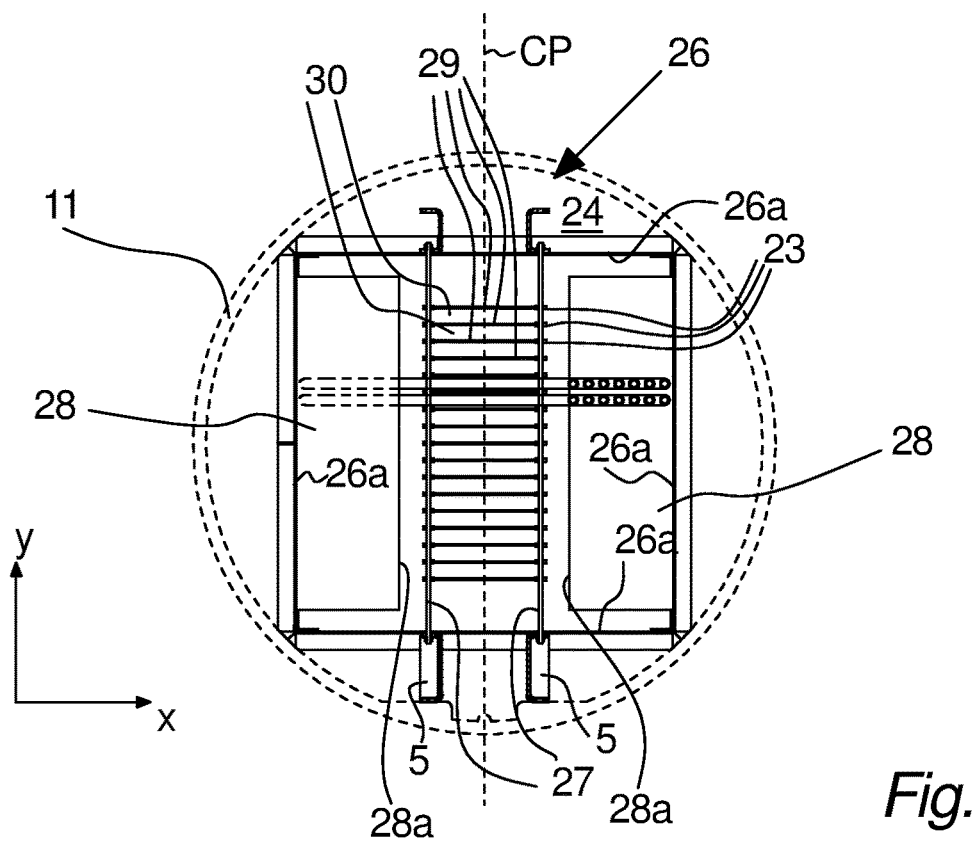
Figure 15:
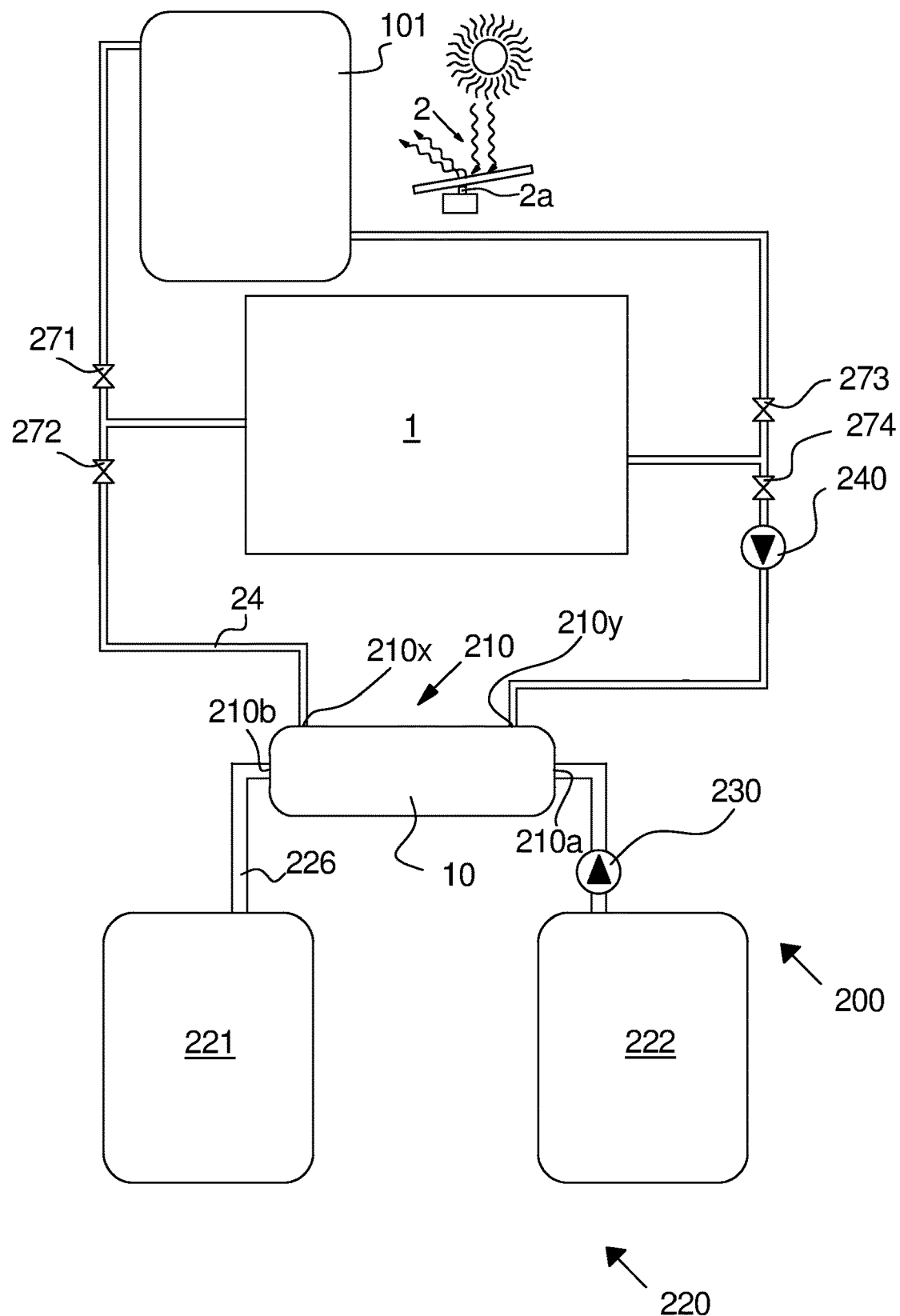
Figure 16:
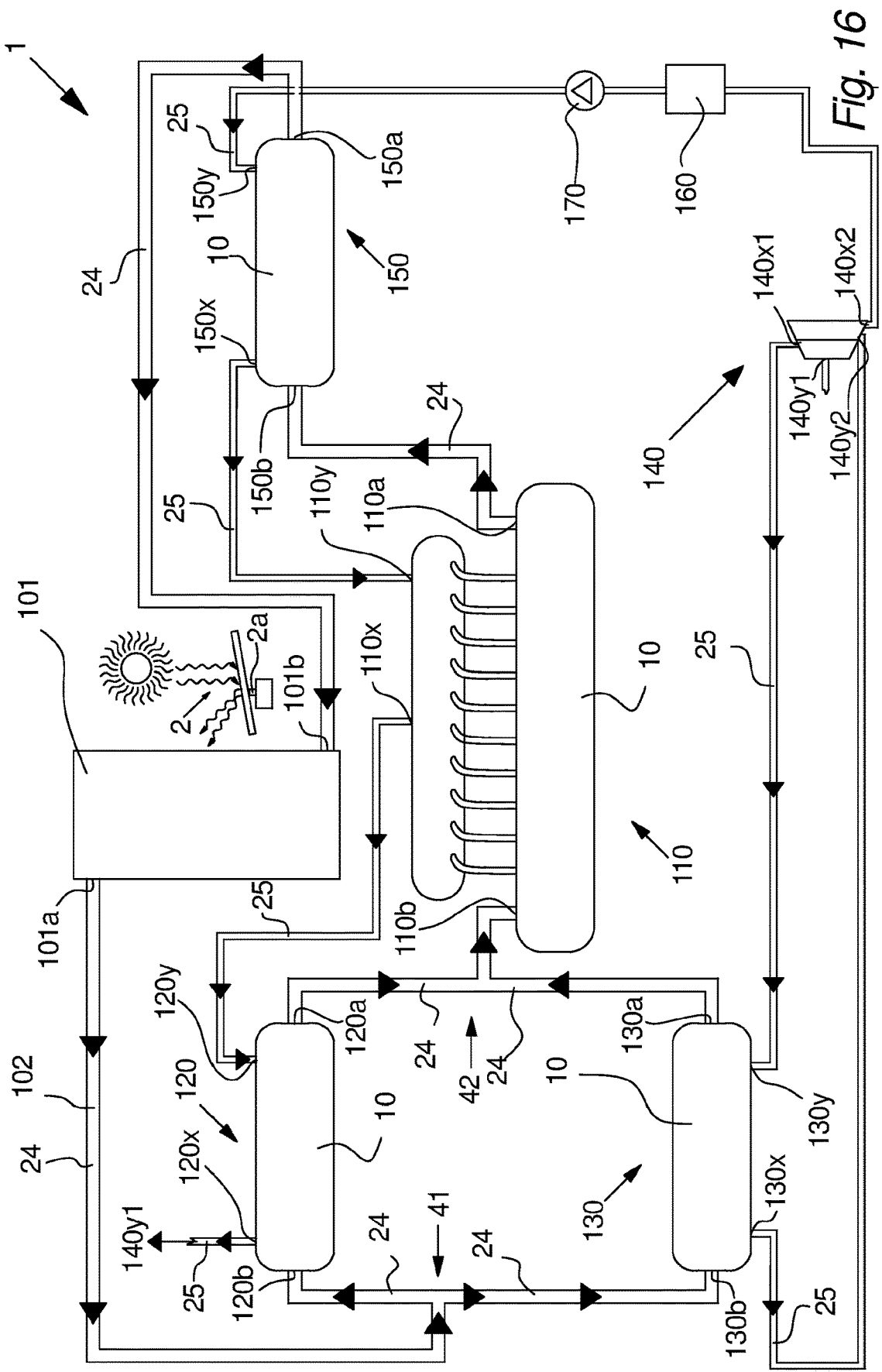
Figure 17:
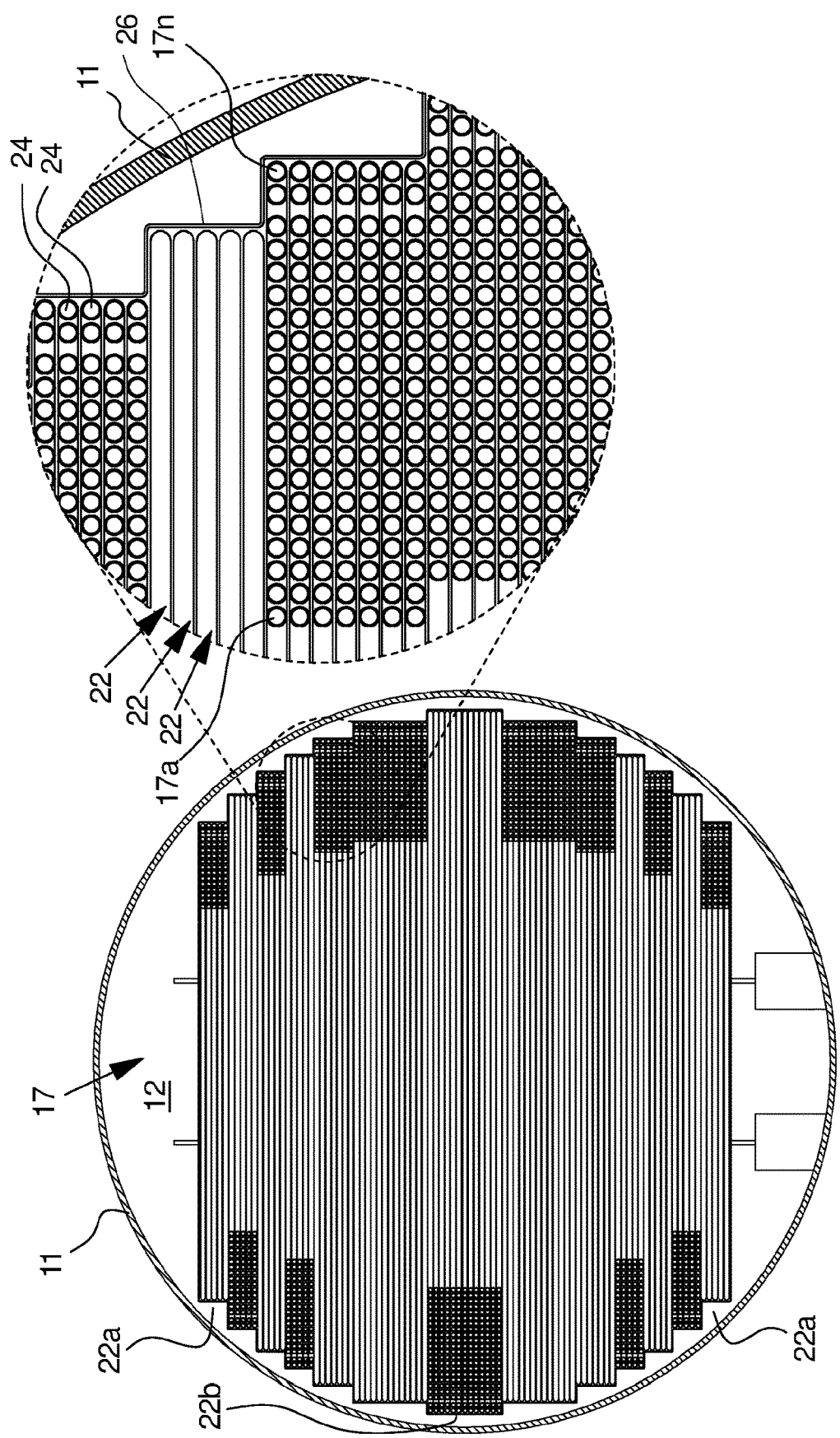
Figure 18:
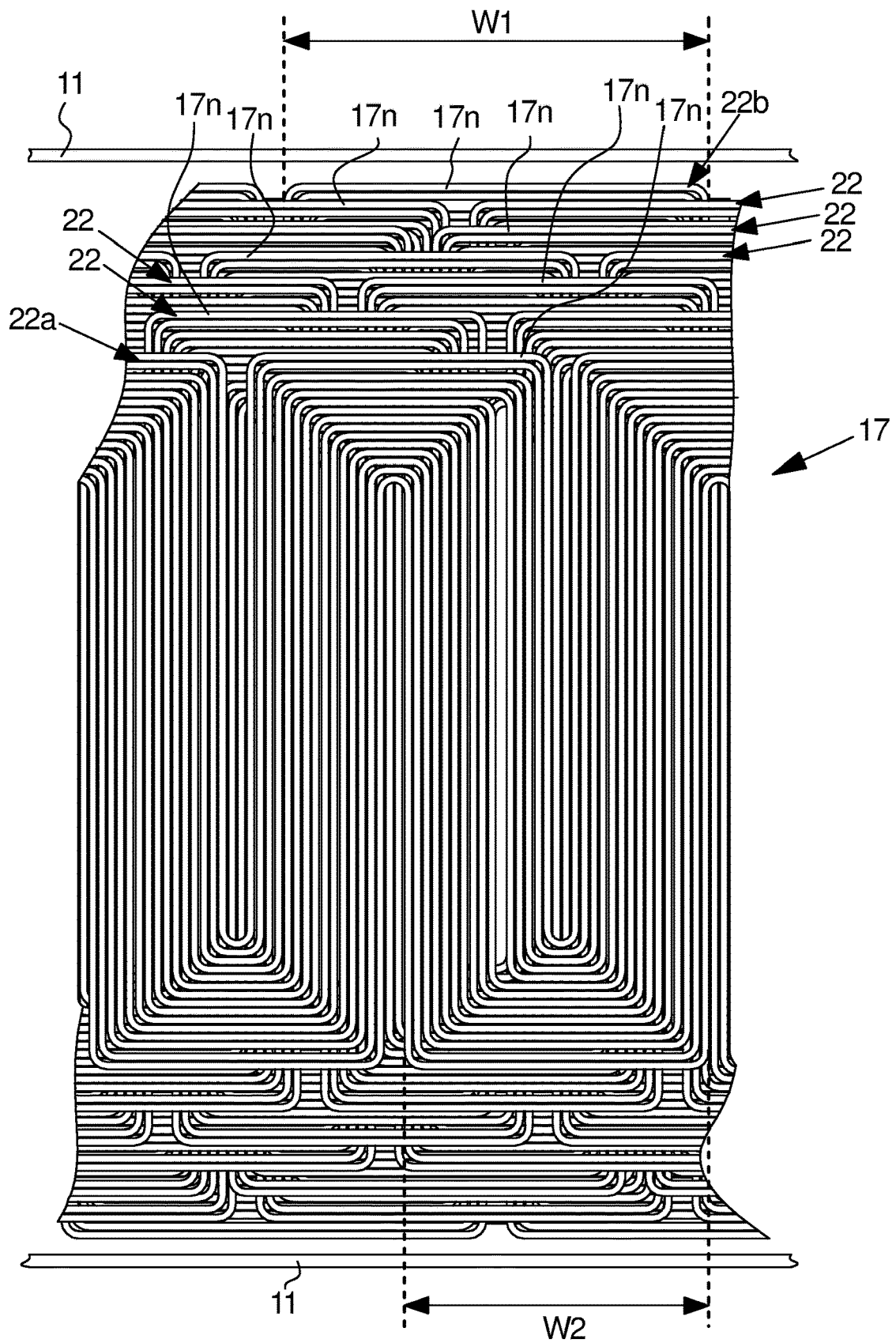

Aspects of the present disclosure will be described in the following with reference to the figures in which:

FIG. 1 illustrates a solar power plant according to embodiments of the invention, FIG. 1a illustrates schematically embodiments of the invention relating to operation of a steam turbine arrangement driven by a fluid heated by means of solar power FIG. 2 illustrates a heat exchanger according to embodiments of the invention, FIG. 2a illustrates a pipe for use in a pipe bundle of a heat exchanger according to embodiments of the invention FIG. 3 illustrates a heat exchanger according to further embodiments of the invention, FIG. 4 illustrates a pipe connector/header for a heat exchanger according to embodiments of the invention, FIG. 5 illustrates a heat exchanger according to further embodiments of the invention, where pipe crests extend in the longitudinal direction of the heat exchanger FIG. 6 illustrates a pipe connector/header for a heat exchanger according to further embodiments of the invention, FIG. 7 illustrates an evaporator arrangement comprising heat exchangers, according to embodiments of the invention FIG. 8 illustrates a heat exchanger according to embodiments of the invention, comprising vortex-generating elements, FIG. 9 illustrates a part of a heat exchanger according to embodiments of the invention, FIG. 10 illustrates a heat exchanger according to embodiments of the invention, comprising vortex-generating elements arranged in an enclosure inside a heat exchanger, FIGS. 11a-11d illustrates different embodiments of the invention relating to possible distribution of vortex generating elements in a heat exchanger FIG. 12 illustrates an embodiment of the invention where flow-guiding elements are arranged to extend into, inner recesses provided by a pipe bundle FIG. 13 illustrates embodiments of the invention comprising flow-guiding elements, FIG. 14 illustrates embodiments of the invention wherein a heat exchanger comprises both flow guiding elements and vortex generating elements, FIG. 15 illustrates schematically a system for storing heat energy obtained by means of a solar power plant and for collecting the stored heat energy to be used for generating steam in a solar power plant according to embodiments of the invention, FIG. 16 illustrates a system according to embodiments of the invention wherein a first re-heater receives steam from a steam turbine, FIG. 17 illustrates another embodiment of a heat exchanger according to the invention, and FIG. 18 is another view of the heat exchanger of FIG. 17.

DETAILED DESCRIPTION

FIG. 1 illustrates schematically a part of a solar power plant 1 for generating electric power for the utility grid according to embodiments of the present invention.

The solar power plants may be configured to generate e.g. between 10 MW and 1000 MW of electric power, such as between 25 MW and 800 MW of electric power dependent on the rated capacity of the solar power plant and/or the amount of energy in the sun light.

The solar power plant comprises a heating system comprising a plurality of solar absorbers 2 controlled to keep reflecting sunlight toward a heating unit 101 arranged to be heated by the sun, so that the solar absorbers 2 compensates for the sun's apparent motions in the sky. The positioning of the solar absorbers is normally controlled by a software solution, which controls a drive mechanism 2a. Only one solar absorber is illustrated in order to improve simplicity of FIG. 1, but it is understood that the solar power plant may comprise e.g. between 20 and 2000000, solar absorbers, e.g. between 100 and 350000 solar absorbers and all directed to transmit the reflecting sunlight towards one or more heating units 101.

The heating system comprises a heating unit in FIG. 1 comprising a vessel which contain a fluid such as molten salt or thermal oil, which is heated by the sunlight. The heating unit 101 comprises an outlet 101a to a pipe connection 102 guiding the thermal oil or molten salt 24 to a super heater 120 and a re-heater 130 respectively.

It is generally understood that in other embodiments of the invention, the heating system may comprise a solar absorber solution, comprising a plurality of solar absorbers and where each solar absorber is arranged to heat (by means of sunlight) molten salt or thermal oil in a pipe or pipes running between the solar absorbers. In further embodiments of the invention, the heating system may comprise a Fresnel reflector heating solution.

The system 1 comprises:
a super heater 120,
one or more re-heaters 130, 131,
an economizer 150, and
an evaporator unit 110.

One or more of these (120, 130,131, 150, 110) preferably comprises one or more heat exchangers 10 which is/are described in more details later on.

The thermal oil or molten salt received by the super heater 120 and re-heater 130 from the heating unit 101 may in embodiments of the invention have a temperature between 200° C. and 750° C., such as between 300° C. and 650° C.

Super Heater

The super heater receives the molten salt or thermal oil from the heating unit 101 through an inlet 120b, and utilizes the molten salt or thermal oil for further heating steam received through a steam inlet 120y from the evaporator unit 110, by means of the heat exchanger 10 of the super heater 120 before the further heated/superheated steam is fed to a steam turbine (not illustrated in FIG. 1) through a steam outlet 120x.

The thermal oil or molten salt leaving the heat exchanger 10 of the super heater 120 through the outlet 120a is fed to the heat exchanger(s) 10 of the evaporator unit 110.

The steam leaving the super heater 120 to the steam turbine through the outlet 120x may in embodiments of the invention be at a pressure between 10 bar and 200 bar, such as between 25 bar and 180 bar, and has a temperature that is higher than the temperature of the steam received from the evaporator unit, e.g. at a temperature between 150° C. and 500° C., such as between 250° C. and 450° C.

First Re-Heater

The system also comprises a re-heater arrangement comprising a first re-heater 130 receiving the thermal oil or molten salt from the heating unit 101 through an inlet 130b. The functionality of the re-heater 130 is described later on, but in short, previously received from the steam turbine is reheated by the heat exchanger 10 of the re-heater 130 before it enters the steam turbine low pressure section. The molten salt or thermal oil leaves the first re-heater 130 through an outlet 130a, and is fed to an inlet 110b of the heat exchanger(s) 10 of the evaporator unit 110.

The steam leaving the first re-heater before it re-enters the turbine at the low pressure part (see FIG. 1a) may, in embodiments of the invention, be at a pressure of 10-50 bar and at a temperature between 300° C. and 750° C., such as between 350° C. and 650° C.

Evaporator Unit

The evaporator unit 110 is arranged to receive heated water and/or steam through an inlet 120y. The heated water and/or steam is heated in the one or more heat exchangers 10 of the evaporator unit 110 to provide a phase transition of water into steam, and this steam leaves the evaporator unit through the steam outlet 110x and is guided to the inlet 120y of the super heater 120. Embodiments of the evaporator unit 110 are described in more details later on.

The molten salt or thermal oil leaves the one or more heat exchangers 10 of the evaporator unit 110 through an outlet 110a, and is guided by a piping system to heat exchangers 10 of an economizer 150 and a second re-heater 131 respectively.

The molten salt or thermal oil entering the evaporator unit 110 may in embodiments of the invention be at/have a temperature between 250° C. and 550° C., such as between 350° C. and 500° C.

The steam leaving the evaporator unit 110 through the steam outlet 110x to the super heater may in embodiments of the invention have a temperature between 180° C. and 400° C., such as between 250° C. and 350° C., preferably at a pressure between 12 bar and 200 bar, such as between 25 bar and 180 bar.

Second Re-Heater

The second re-heater 131 receives this molten salt or thermal oil from the evaporator unit 110 at inlet 131b and is used in the heat exchanger 10 of the second re-heater 131 to heat steam received from the steam turbine through an inlet 131y before it is fed/guided through an outlet 131x to the an inlet 130y of the first re-heater 130, where the steam is further heated by the molten salt or thermal oil received from the heating unit 101, before it re-enters the steam turbine 140 from the outlet 130x e.g., in embodiments of the invention, at a pressure between 15 bar and 50 bar, such as between 20 bar and 30 bar, and having a temperature between 250° C. and 750° C., such as between 300° C. and 500° C.

The steam from the outlet 131x of the second re-heater 131 may in embodiments of the invention be at a pressure between 10 bar and 35 bar, such as between 16 bar and 30 bar, and have a temperature lower than at the outlet 130x of the first re-heater 130, e.g. such as a temperature between 250° C. and 450° C., such as between 280° C. and 400° C.

The molten salt or thermal oil 24 leaves the heat exchanger 10 of the second re-heater 131 at the outlet 131a and is returned to an inlet 101b of the heating unit 101 to be heated by sunlight.

Economizer

The economizer 150 receives the molten salt or thermal oil into the inlet 150b from the outlet 110a of the heat exchanger 10 of the evaporator unit 110. This molten salt or thermal oil is utilized for heating water and/or steam received through inlet 150y from the steam turbine, before this water and/or steam leaves the heat exchanger 10 of the economizer 150 through outlet 150x and is fed/guided to the inlet 110y of the evaporator unit 110 to be evaporated as explained above.

The water/steam entering the economizer 150 may in embodiments of the invention have a temperature of e.g. between 180° C. and 350° C., such as between 200° C. and 300° C., and be at a pressure between 12 bar and 200 bar, such as around 16-185 bar.

When the molten salt or thermal oil leaves the heat exchanger 10 of the economizer 150 at the outlet 150a, it is returned to an inlet 101b of the heating unit 101 to be heated by sunlight.

FIG. 1a illustrates schematically embodiments of the invention relating to the operation of the steam turbine 140 which is driven by steam generated by means of e.g. one or more heat exchangers 10 of the system of FIG. 1.

The circuitry for the molten salt or thermal oil is not illustrated in FIG. 1a in order to improve the simplicity of the drawing.

The steam turbine arrangement is connected to a generator G configured to generate and deliver electric power EP to the utility grid UG. The steam generator 140 receives the steam from the super heater 120 through an inlet arrangement 140y1 to a high pressure part 141 of the steam turbine arrangement 140.

The steam, which has been reduced in pressure and temperature in the steam turbine arrangement 140 at a high-pressure part 141. For example, in embodiments of the invention, the high pressure part 141, may reduce the steam from a pressure e.g. between 95 bar and 130 bar, such as between 100 bar and 115 bar at a temperature between 300° C. and 450° C., such as between 350° C. and 400° C., and to a pressure of e.g. 15 bar to 25 bar such as between 18-22 bar at a temperature between 150° C. and 250° C., such as between 190° C. and 220° C.

The steam then enters the second re-heater 130 from outlet 140x1, and subsequently the first re-heater 130, before it is reintroduced through an inlet 140y2a to a low pressure part 142 of the steam turbine arrangement 140, to provide further energy to the steam turbine.

Then the steam leaves the low pressure part through outlet 140x2 and enter a condensing unit, which condenses the steam, and the water from the condensing unit 160 then enter a pump 170 which pressurizes the water before the water enter the economizer 150 again.

It is generally to be understood that the steam may be condensed by the condensing unit and be water in liquid state from at least the condenser, through the economizer and to the evaporator. From the evaporator, the fluid to drive the steam turbine may be in steam form, through the super heater, the steam turbine and the re-heaters.

FIG. 2 illustrates schematically a heat exchanger 10 according to embodiments of the invention for providing heat exchange between fluids 24, 25.

This heat exchanger may e.g. be provided in a solar power plant 1, such as in a system as e.g. described in relation to FIG. 1 and/or FIG. 1a, or FIGS. 15 and/or 16.

It is however understood that generally, the present disclosure is not limited to use of such heat exchangers in solar power plants/systems. It may also, in further embodiments of the present disclosure, be used or for use in other suitable types of industrial applications. For example, the heat transferring fluid 24, 25 (dependent on the application), such as molten salt, thermal oil or any other suitable fluid for transferring heat through the walls of the pipe bundle 17 inside the container 11, may be heated by any suitable source, such as excess power and/or other types of renewable energy sources as e.g. described in more details later on. And may be used for generating industrial heat without generating electric power by means of a turbine, It may be used alone for providing electric power, or it may be used so as to provide a combination of electric power and industrial heat.

The heat exchanger 10 comprises a container 11 configured to house a first fluid 24.

The heat exchanger moreover comprises a first pipe connector 13 and a second pipe connector 14, which may in preferred embodiments of the invention be headers having e.g. a tubular form and preferably extending into the interior 12 of the container 11 from a sidewall. Each pipe connector 13, 14 comprises a cavity 15.

The heat exchanger comprises a pipe bundle 17 arranged inside the container 11 and extending meandering between the first and second pipe connectors 13, 14. These pipes 17a-17n of the pipe bundle 17 are configured to guide a second fluid 25, such as e.g. water or steam between the pipe connectors in the cavity 12, and this fluid may the end may be the fluid to drive a steam turbine.

A plurality of pipe connection points 16 are distributed around the periphery of the pipe connectors 13, 14, which may also be referred to as headers, so the internal of the pipes 17a-17n is in fluid communication with the cavity 15.

The pipe bundle 17 in the container 11 is connected to the first and second pipe connectors 13, 14 at the pipe connection points 16 so the inside of the pipes 17a-17n of the pipe bundle 17 is in fluid communication with the cavities 15 of the first and second pipe connector 13, 14.

This first fluid 24 outside the pipes 17a-17n may in preferred embodiments of the invention be the molten salt or thermal oil which is arranged to surround the pipes 17a-17n of the pipe bundle 17 in the container 11 in order to transfer heat energy from the molten salt or thermal oil to the fluid 25 in the pipes 17a-17n through the walls of the pipes 17a-17n of the pipe bundle 17. The fluid inside the tubes can also be thermal oil that is heated or cooled by molten salt from the outside.

The container 11 comprises an inlet "b" and an outlet "a" for the fluid 24. The water or steam enter the pipe bundle through an inlet connected to one of the first and second pipe connectors 13, 14, into the cavity 15, and is therefrom distributed to the pipes 17a-17n of the pipe bundle to provide heat transfer between the fluid 24 in the container compartment 12 and the internal of the pipes 17a-17n, where after it enters the cavity 15 of the other of the first and second pipe connectors 13, 14, and therefrom to an outlet of the heat exchanger for the water or steam or between thermal oil and molten salt.

It is however generally to be understood that in other embodiments of the invention, the fluid 25 may be the molten salt or thermal oil, and the fluid in the container compartment 12 may be the water or steam, and this may also depend on whether the heat exchanger 10 is for an evaporator, super heater, economizer or a re-heater.

The pipes 17a-17n of the pipe bundle 17 are in FIG. 2 arranged next to each other and extend together between the pipe connectors 13, 14 in the longitudinal direction LD of the container 11 in a meandering manner providing a plurality of oppositely directed crests 20a, 20b on the pipes 17a-17n between the pipe connectors 13, 14, and so that crests 20a, 20b of pipes 17a-17n of the pipe bundle 17 are arranged to extend into recesses 21 provided by one or more crests 20a, 20b on other pipes 17a-17n of the pipe bundle 17.

The pipes 17a-17n of the pipe bundle 17 may in preferred embodiments of the invention have an inner diameter D (see FIG. 2a) between 13 mm and 35 mm such as around 14 mm, see FIG. 2a, but in other embodiments, the diameter D may be larger such as a diameter between 20 mm and 25 mm, e.g. around 22 mm.

The pipes of the pipe bundle 17 are preferably metal pipes such as corrosion resistant metal pipes.

The meandering manner of the pipes 17a-17n, and that the pipes extend together next to each other, provides the crests 20a, 20b, and an inner recesses 21a of the pipe bundle 17.

As can be seen in FIG. 2, the crests 20a, 20b may extend in a direction transverse to the longitudinal direction LD of the container 11 between the pipe connectors 13a, 13b, and go from a first crest 20a, to another oppositely directed crest 20b, before it returns to a crest extending in the same direction as the first crest 20a.

In preferred embodiments of the invention, the tube bundle may comprise between 5 and 100 crests 20a, 20b, such as between 10 and 40 crests, 20a, 20b, between the pipe connectors 13, 14.

The length of the heat exchanger 10 may in embodiments of the invention be between 5 and 30 meters, such as between 8 and 25 meters.

The pipes of the tube bundle are in preferred embodiments of the invention distributed in layers 22 of pipes 17a-17n, and FIG. 2 illustrates one of such layers 22.

FIG. 3 illustrates a cross sectional view of heat exchanger 10 according to preferred embodiments of the invention, seen through a plane perpendicular to the longitudinal direction of the heat exchanger 10.

The layers 22 of pipes 17a-17n are distributed in a direction y transverse to a longitudinal direction LD of the container 11, and each of the plurality of pipe layers 22 comprises pipes 17a-17n extending in the meandering manner as illustrated in FIG. 2.

The pipe bundle 17 extend in the longitudinal direction LD of the container 11 in the container cavity 12 and has a substantially rectangular cross sectional shape in a transverse x-y plane extending perpendicular to the longitudinal direction LD of the container 11 e.g. in order to provide pipes 17a-17n of substantially the same length in the pipe bundle 17.

The heat exchanger container 11 is preferably arranged to support on a floor or the ground 3 by means of a leg support arrangement 4 and extend substantially horizontally but can also be vertically especially for the evaporator with water/steam on tube side.

The pipe layers 22 are preferably substantially horizontal layers arranged on top of each other. The pipe bundle 17 is preferably supported at least on the bottom part of the container by one or more pipe bundle supports 5.

The layers 22 are preferably substantially similar and provides coinciding inner crests (see FIG. 2) for e.g. receiving a common flow guiding element 28 as e.g. described in more details later on.

As described in more details later on, the pipe layers are preferably kept with an intermediate distance between adjacent pipe 22 layers by distancing elements 23 (described in more details later on), which may be kept in place by means of a distancing element support arrangement (not illustrated in FIG. 3). These distancing element support arrangement preferably support on a bottom part of a flow guiding enclosure and/or a bottom part of the container 11 by means of the pipe bundle supports 5.

FIG. 4 illustrates a pipe connector 13, 14 to be arranged in the container 11 and to be connected to the pipes of the pipe bundle. Each of the first and second pipe connectors 14, 15 comprises a plurality of pipe connection points 16. In FIG. 4, an "inlet pipe connector" is illustrated where it can be seen that the flow of fluid 25 enters the cavity 15 through an inlet, and is distributed in the pipe connector 14, 15 and leaves the pipe connector through the plurality of outlets of the pipe connector points 16.

The pipe connector points are distributed around the periphery of the pipe connector 13, 14, which preferably has a tubular shape, and moreover the pipe connector points 16 are distributed in the longitudinal direction LDPC of the pipe connector 13, 14, preferably in a layer structure so that the pipe connector can be connected to the individual layers 22 of the pipe bundle 17 as e.g. illustrated in FIG. 2.

The longitudinal direction LDPC of the pipe connector 13, 14 may preferably extend into the container compartment 12 in a direction transverse to the longitudinal direction of the container 11, e.g. vertically if the heat exchanger container 11 is arranged horizontally.

Generally, it is understood that the pipes 17a-17n may preferably be connected to the pipe connectors 13, 14 by means of welding or soldering.

The heat exchanger may generally, according to embodiments of the invention, comprise between 10 and 80 layers 22 of pipes 17a-17n such as between 15 and 60 layers 22.

Each pipe layer 22 may preferably comprise between 3 and 30 pipes 17a-17n such as between 5 and 25 pipes, in the example of FIGS. 2 and 3, the layers 22 each comprises 7 pipes.

FIG. 5 illustrates schematically an embodiment of the invention, wherein the pipes of the pipe bundle 17 extend in a meandering manner so that the crests 20a, 20b extend in the longitudinal direction LD of the container 11, and in opposite directions towards the opposite ends of the container 11.

The pipes of the pipe bundle 17 extend in the longitudinal direction LD of the container 11 in the container cavity 12 forwards and backwards between opposite ends of the container, thereby providing the crests 20a, 20b.

FIG. 6 illustrates a pipe connector 13, 14 to be arranged in the container 11 and to be connected to the pipes of the pipe bundle 17 as e.g. illustrated in FIG. 5. As can be seen, the pipe connector 13, 14 is, as also disclosed in relation to the embodiments relating to FIG. 4, arranged to be connected to layers 22 of pipes of the pipe bundle.

The pipes of the pipe bundle provides a substantially rectangular cross sectional shape in a transverse plane extending perpendicular to the longitudinal direction LD of the container 11 e.g. in order to provide pipes 17a-17n of substantially the same length in the pipe bundle 17.

FIG. 7 illustrates an evaporator unit 110 according to embodiments of the invention comprising two heat exchangers 10 and a further steam container 111 in fluid communication with the heat exchangers 10 of the evaporator unit 110.

The evaporator unit 110 comprises an inlet 112 for water 25, which is guided through one or more pipes/downcomers 113 to the heat exchangers 110. The water is heated by the pipe bundle 17 and the generated steam there from enters the steam container 111 through a riser arrangement/one or more riser pipes 114 providing a fluid connection for steam to the steam drum/steam container 111.

The steam in the steam drum, from the heat exchangers 10, enters a separation arrangement 115 for such as one or more cyclones and/or chevrons for separating steam. The water separated from the steam leaves the separator arrangement 115 through an outlet/drain 115a and into the steam container again, and the steam leaves the evaporator unit through the outlet 116, e.g. so as to enter a super heater as previously explained.

The heat exchangers 10 of the evaporator unit 110 may in embodiments of the invention, as illustrated in FIG. 7, be horizontally arranged. There are shown 2 evaporators but this can also be one or more.

In other embodiments of the invention, (not illustrated), the evaporator unit/arrangement 110 may comprise one or more heat exchanger(s) 10 arranged vertically, and the steam container/drum may preferably be arranged above/at a level over the vertically arranged heat exchanger, and connected to the heat exchanger by one or more riser pipes 114 for the steam generated by the heat exchanger.

FIG. 8 illustrates a heat exchanger 10 according to preferred embodiments of the invention.

The pipework if the pipe bundle 17 preferably substantially corresponds to that of the heat exchanger illustrated in FIGS. 2 and 3.

The pipe bundle 17 is arranged inside a flow guiding enclosure 26 in the container 11. The flow guiding enclosure 26 extend in the longitudinal direction LD of the container and comprises walls 26a for guiding a fluid flow of the first fluid 24 over the pipe bundle from an inlet to an outlet (not illustrated) of the container 11.

The walls 26a preferably provides that the flow guiding enclosure 26 has a rectangular cross sectional shape and encloses a rectangular-shaped pipe bundle 17. The flow of molten salt or thermal oil is guided from an inlet, into the flow guiding enclosure 26 and over the layers 22 of pipes 17a-17n of the pipe bundle to an outlet. During this, the flow of molten salt or thermal oil in the compartment 12 is forced to flow over pipes 17a-17n of the pipe bundle in a direction transverse to the extent of the pipes a plurality of times due to the meandering manner of the pipes 17a-17n.

In further embodiments of the invention the heat exchanger 10 comprises vortex generating elements 29 arranged to extend between adjacent pipe layers 22 of said pipe bundle 17.

The heat exchanger comprises a plurality of pipe distancing elements 23, such as rods, extending in the longitudinal direction of the container 11. These pipe distancing elements 23 are arranged to maintain a minimum distance between the layers 22 of pipes 17a-17n in the pipe bundle 17, to assure a flow of the molten salt, thermal oil, water/steam and/or the like dependent on the heat exchanger configuration, over the pipe 17a-17n layers 22, between the layers.

The vortex generating elements 29 are arranged to extend between the pipe distancing elements 23 and between adjacent pipe layers 22 of said pipe bundle 17.

The vortex generating elements 29 comprises longitudinal members, such as rods, arranged to extend in a direction transverse to the longitudinal direction LD of the container 11. In preferred embodiments of the invention, the heat exchanger 10 comprises a plurality of the vortex generating elements 29.

The heat exchanger 10 preferably comprises a plurality of vortex generating elements 29 distributed in the longitudinal direction of the heat exchanger 10, and distributed between different layers 22 of pipes of the pipe bundle 17.

The pipe distancing elements 23 and the vortex generating elements 29 between two adjacent pipe layers 22 may e.g., in embodiments of the invention together form a ladder structure between adjacent pipe layers.

FIG. 9 illustrates, in perspective, a part of the flow guiding enclosure 26 and the pipe distancing elements 23 to be placed between adjacent pipe layers 22 of the pipe bundle 17. The pipes of the pipe bundle have been omitted from the drawing while maintaining the intended position of the pipe distancing elements 23 in order to improve the understanding of the drawing.

The pipe distancing elements 23 are kept in place by means of a distancing element support arrangement 27 which may support on a bottom part of the flow guiding enclosure 26 and/or a bottom part of the container 11.

FIG. 10 illustrates, a flow guiding enclosure 26 and the pipe distancing elements 23 placed between adjacent pipe layers 22 of the pipe bundle 17 (Only a few pipe layers are illustrated to improve understanding of the figure) seen through a x-y plane perpendicular to the longitudinal direction of the flow guiding enclosure 26/heat exchanger 10.

As can be seen, a plurality of vortex generating elements 29 are arranged parallel to each other between two pipe layers 22, and between the pipe distancing elements 23.

The pipe distancing elements 23 are kept in place by the distancing element support arrangement 27 which comprises parallel rods that support on a bottom part of the bottom part of the container 11.

FIGS. 11a-11d illustrates schematically different embodiments of the invention relating to examples of possible distribution of the vortex generating elements 29 in the flow guiding structure 26. The drawing is seen through a y/z plane (see e.g. FIG. 9) extending in the longitudinal direction LD of the flow guiding enclosure/heat exchanger, and the pipes of the pipe bundle 17 as well as the pipe distancing elements 23 have been omitted from the drawing to improve the understanding. Rods can also be placed in the side of the meandering tubes to reduce flow in the sides.

The vortex generating elements 29 are arranged in different spaces 30 between the location/spaces 32 for the pipe layers 22. Each of these spaces 30 comprises a plurality of said vortex generating elements 29 distributed in the longitudinal direction LD/z-direction of the flow guiding enclosure/heat exchanger in rows and columns.

In FIG. 11a, the vortex generators 29 are distributed with the same distance between the generators 29, between each layer of pipes. In FIG. 11b, fewer vortex generators 29 are utilized, and they are arranged alternating in the longitudinal direction LD between two adjacent spaces 30.

In FIGS. 11c and 11d, the vortex generators 29 are distributed more sporadically in the spaces 32 between the between the pipe layers, e.g. based on a computer flow modelling of the internal of the flow guiding enclosure 26 comprising the pipe layers, the pipe distancing elements 23 and/or the like.

Common to all the figures of FIGS. 11a-11d is that a plurality of the vortex generating elements (29) are distributed in the longitudinal direction (LD) of the heat exchanger (10), and distributed between the spaces 32 for the different layers of pipes of the pipe bundle.

The heat exchanger may as illustrated comprise a group of said vortex generating elements 29 distributed in the same space 30 in the longitudinal direction LD of the heat exchanger 10 between pipe layers, and said group comprises at least two, preferably at least five such as at least ten of said turbulence generating elements 29. Preferably, different spaces 30 between different, adjacent pipe layers 22 may each comprise a plurality of the vortex generating elements 29.

FIG. 12 illustrates further preferred embodiments of the invention. Here, flow guiding elements 28 extend into inner recesses 21a provided by one or more crests 20a, 20b of the pipe bundle 17.

The heat exchanger comprises a plurality of the flow guiding elements 28 which arranged to extend into different, inner recesses 21a provided by the one or more crests 20 of the pipe bundle from opposite sides of the pipe bundle.

The flow guiding elements 28 may in preferred embodiments of the invention comprise plates configured to extend into the inner recesses 21a in a plane transverse to the longitudinal direction LD of the container 11, preferably in a plane substantially perpendicular to the longitudinal direction LD of the container 11/heat exchanger.

The flow guiding elements 28 are fixed to the flow guiding enclosure 26, preferably by being fixed to inner wall surfaces of the walls 26a flow guiding enclosure 26.

Alternatively, the flow guiding elements may in other embodiments of the invention be connected to e.g. an inner wall of the container 11, to another frame structure than a flow guiding enclosure in the container and/or the like.

The flow guiding elements may preferably be arranged so that a flow space 31 for the fluid 24 in the container 11 is provided between an edge 28a of the flow guiding elements 28 proximate the inner bended surface 36 of the pipe(s) 17n providing the inner recesses (21a).

The meandering form of the pipes 17a-17n provides the inner recesses 21a which are distributed alternating in the longitudinal direction LD of the container/flow guiding enclosure 26 from opposing walls 26a of the flow guiding enclosure, thereby providing a space for the flow guiding elements/baffles 28 which extent into the interior of the flow guiding enclosure 26 at the positions determined by the position of the inner recesses 21a.

The flow guiding elements 28, in preferred embodiments of the invention, extend into inner recesses 21a provided by one or more crests 20 of the pipe bundle of a plurality of layers 22 of pipes of the pipe bundle 17, as illustrated in e.g. FIG. 13. To improve the understanding of FIG. 13, most of the pipe layers 22 have been omitted and only two have been remained.

In embodiments of the invention, as illustrated in FIGS. 12 and 13, the flow guiding elements 28 may overlap the centre plane CP, such as a vertical centre plane as illustrated, extending in the longitudinal direction LD, to force a wavy path for the fluid 24, but in other embodiments of the invention, the flow guiding elements 28 may not overlap the vertical centre plane CP (see e.g. FIG. 14), or the edges 28a may extend just to/terminate at the centre plane CP (not illustrated).

FIG. 14 moreover illustrates further embodiments of the invention, wherein the heat exchanger 10 comprises both flow guiding elements 28 and vortex generating elements 29 arranged to extend between pipe distancing elements 23 and between adjacent pipe layers 22 of said pipe bundle 17.

Generally it is understood that even though the fluid that is heated by the sunlight and used to generate and/or heat steam is described above to e.g. be molten salt or thermal oil, it is understood than any other suitable type of fluid may be utilized for this purpose.

FIG. 15. Illustrates schematically a system 200 according to embodiments of the invention, for storing heat energy obtained by means of a solar power plant and for collecting the stored heat energy to be used for generating steam in a solar power plant.

The system 200 is connected to a system 1 of a solar power plant (e.g. a system described in relation to FIG. 1 and/or FIG. 16) which is configured to generate steam and drive a steam turbine based on heat generated by means of sunlight, so as to generate electric power.

The system 200 comprises a heat exchanger 10, 210 arranged to provide heat exchange between thermal oil 24 and molten salt 226 when in liquid state. The molten salt 226 is arranged in a molten salt system comprising a molten salt storage arrangement 220. This molten salt storage arrangement 220 comprises a first storage 221 and a second storage 222, and the heat exchanger 210, 10 is in fluid communication with the first and second molten salt storages 221, 222.

The system 200 comprises a pumping arrangement 230 configured to transfer molten salt between the first 221 and second 222 molten salt storages through the heat exchanger 210, 10.

The heat exchanger 10 is configured to be driven in a first and a second operating mode. The first operating mode comprises that molten salt is transferred from the second molten salt storage 222 to the first molten salt storage 221 through said heat exchanger 210, 10 so as to provide a heat transfer from the thermal oil to the molten salt. This heat transfer is provided by means of thermal oil received from a heating system 101, so as to raise the temperature of the molten salt before it is provided to the first storage 221. The first storage 221 thus provides a heat storage which may be used later on, e.g. during night and/or if e.g. the amount of available sunlight is not considered sufficient.

The second operating mode comprises that molten salt is transferred from the first molten salt storage 221 to the second molten salt storage 222 through the heat exchanger 10, 210 by means of the pumping arrangement 230 so as to transfer heat energy to the thermal oil by the heat exchanger 210. This heated thermal oil is thus arranged to enter the steam generating system 1, and thereby provide heated thermal oil to be utilized in e.g. a super heater, evaporator, re-heater(s) and/or an economizer e.g. as described in relation to FIG. 1 and/or FIG. 16.

A shift/switch between the first and second operation modes is in preferred embodiments of the invention configured to be provided by a control system (not illustrated) by shifting the pumping direction of the a pumping arrangement 230 The system may moreover comprise a further pumping arrangement 240 arranged to control the flow and/or flow direction of the thermal oil 24 dependent on the operational mode.

The shift between operation modes may also, in embodiments of the invention, comprise controlling one or more valves so as to alter the flow direction of thermal oil in the heat exchanger 10, 210.

In embodiments of the invention, the system 200 comprises one or more valves 271, 272, 273, 274 configured to be controlled dependent on the first or second operation mode. For example, the valves 271, 272, 273 and 274 may be opened by a control system when in the first operating mode so that the first fluid 24 is supplied from the heating system 101 and to both heat exchanger 210 and the system 1. The valves 271 and 273 may be closed when in the second operating mode.

The further pumping arrangement 240 may thus be arranged to provide thermal oil towards the heat exchanger 210 from the heating system 101 when in the first operating mode. Here, the flow of heated oil from the heating system, 110 may be divided between system 1 and the system 200 respectively.

The pumping direction of further pumping arrangement 240 may be changed when switching to the second operating mode, to provide the thermal oil, after usage in the system 1, towards the heat exchanger 210 again to be reheated by the stored heat in the molten salt of the storage 221.

The valves 272 and 274 may in embodiments of the invention be closed in the event that a heating of the molten salt in the storages 221, 222 is not considered necessary. One or more of the valves 271, 272, 273 and 274 may be considered optional in embodiments of the invention.

The heat exchanger 210 comprises thermal oil inlet and outlet 210x, 210y, and moreover molten salt inlet and outlet 210a, 210b. 210x, may be inlet and 210y may be outlet for the thermal oil when heating molten salt for the storage 221 by heat exchanger 210. 210x, may be outlet and 210y may be inlet for the thermal oil when heating the thermal oil by heat exchanger 210 by means of molten salt from storage 221. 210b may be inlet and 210a may be outlet for molten salt when heating the thermal oil by heat exchanger 210 by means of molten salt from storage 221. 210a, may be inlet and 210b may be outlet for the molten salt when heating molten salt for the storage 221 by heat exchanger 210.

The heat exchanger 210, 10 is preferably a heat exchanger according to one or more of the embodiments as described above, e.g. in relation to one or more of FIGS. 2-14, and provides a liquid/liquid heat exchanger where both the thermal oil and molten salt is in liquid phase during the first and second operation mode. Generally, the heat exchanger 210 preferably comprises pipe connectors/headers 13, 14 connected to a pipe bundle 17 comprising pipes extending in a meandering manner between the pipe connectors, and arranged in layers 22, as e.g. preciously disclosed.

In preferred embodiments of the invention, the pipes of the pipe bundle 17 in the heat exchanger 210 contain the thermal oil (see one or more of FIGS. 2-14), and the compartment 12 of the container 11 surrounding the pipes of the pipe bundle 17 comprises the molten salt.

FIG. 16 illustrates schematically an embodiment of the invention substantially corresponding to FIG. 1, but where only one re-heater is utilized, i.e. the first re-heater.

For both, FIG. 1 and FIG. 16, the system 1 comprises a flow splitting arrangement 41 arranged to divide the first fluid 24 between the super heater 120 and said first re-heater 130. both the flow of first fluid 24 from the super heater 120 and the first re-heater 130 is configured to enter the evaporator unit after leaving the super heater 120 and the first re-heater 130.

In embodiments of the invention, as illustrated in FIG. 16, the first re-heater 130 is arranged to receive steam to be re-heated from an outlet 140x1 of the steam turbine 140 at an inlet 130y of the first re-heater 130 (see e.g. more details according to further embodiments of the invention. The further re-heater 131 as disclosed in FIG. 1 may thus, in embodiments of the invention be omitted so that e.g. all the first fluid from the evaporator 110 enter the economizer.

The systems of FIGS. 1 and 16 moreover provides that the first fluid 24 from the super heater 120 and the re-heater 130 is configured to be intermingled at a pipe connection 42 positioned between outlets 120a, 130a of the super heater 120 and the re-heater 130, and an inlet 110b of the evaporator unit 110, before it enters the evaporator unit 110.

In other embodiments of the invention (not illustrated), the first fluid 24 from the super heater 120 and the re-heater 130 may be configured to be intermingled in the evaporator unit 110.

The system of FIG. 16 and/or 1 may in embodiments of the invention be configured to provide a continuous rising flow of molten salt in order to reduce the amount of drain and vent valves.

To obtain this, the economizer 150 may be vertically displaced to a higher position than said super heater 120 and first re-heater 130. For example, the economizer 150 may be arranged at a level above the outlet 110a of the evaporator unit 110 for the first fluid 24. This may e.g. allow a drainage of the first fluid, such as molten salt or thermal oil from the economizer, through the evaporator unit by means of gravity.

The evaporator unit 110 as illustrated in FIG. 16 and/or 1 may in embodiments of the invention be vertically arranged (not illustrated), e.g. so preferably is vertically so that the longitudinal direction of at least the heat exchanger(s) 10 of the evaporator unit extend vertically. In other embodiments of the invention, the heat exchanger(s) of the evaporator unit may be arranged horizontally, e.g. as illustrated in FIGS. 1 and 16.

The various embodiments of the invention as illustrated in and/or described in relation to one or more of FIGS. 2-14 may be especially suitable for heat exchangers for an economizer, an evaporator and/or a re-heater as e.g. described in relation to FIGS. 1-1a and/or FIG. 16, and/or a heat exchanger 210 as described in relation to FIG. 15.

The piping of the pipe bundle 17 as illustrated in FIG. 5 may be especially suitable for heat exchangers of an evaporator unit, whereas the piping of the pipe bundle 17 as illustrated in e.g. FIGS. 2 2 and 3 and other of the described figures may be especially suitable for a super heater, an economizer, a re-heater and/or a heat exchanger 210 as described in relation to FIG. 15.

A particular layout of the pipe bundle 17 of a heat exchanger according to the invention is shown in FIGS. 17 and 18, of which FIG. 17 shows a cross section of the cylindrical container 11 and the pipe bundle 17, whereas FIG. 18 is a view of the pipe bundle 17 of the heat exchanger of FIG. 17 as seen from the top of the pipe bundle 17. The pipe bundle 17 comprises 93 layers 22 of pipes 17a-17n arranged horizontally in the container 11 within a flow guiding enclosure 26. The layers 22 of pipes 17a-17n each comprises a plurality of pipes 17a-17n that extent in a meandering manner, which is seen in particular in FIG. 18. The width of the layers 22 of pipes 17a-17n in the horizontal direction are adapted to the cross sectional shape of the container 11 and are of different width in a direction transverse to a longitudinal direction (LD) of the container 11 as is apparent from FIG. 17. In FIG. 18 where the pipe bundle 17 is shown from above in a longitudinal section of the container 11, the width of the layers 22 is seen from top to bottom of the figure. The 13 widest middle layers 22b are flanged above and below of 13 layers 22 of a reduced width, which again are flanged above and below of 7 layers 22 of further reduced width followed by four further groups of layers 22, each group comprising 5 layers 22 of pipes 17a-17n of increasingly reduced width. The width of the top layers 22a and bottom layers 22a of pipes 17a-17n of the smallest width is about 66% of the width of the widest layers 22b of pipes 17a-17n.

The layers 22a of smaller width comprises generally fewer pipes 17a-17n than layers 22b of larger width, and the number of pipes of each of the layers 22a of pipes 17a-17n of the smallest width is 15 whereas the number of pipes of each layer 22b of pipes 17a-17n of the largest width is 22. With the fewer number of pipes 17a-17n, the layers 22a of the smaller width will have a larger number of crests 20a, 20b, than layers 22 of larger width, which is shown in FIG. 18 where the length w2 of a crest 20a, 20b of the top layer 22a, which is the layer 22a of smallest width, is noticeably smaller than the length w1 of a crest 20a, 20b of the layer 22b of the largest width.

Hereby it is obtained that the although the transversal flow distance inside the pipes 17a-17n of the layers 22 of smaller width is made shorter, this is counteracted by the smaller number of pipes 17a-17n in those layers 22 as compared to layers 22 of larger width, whereby each pipe 17a-17n will have a larger number of crests 20a, 20b than pipes 17a-17n in layers 22 of larger width and the overall flow resistance inside each pipe 17a-17n of the heat exchanger 10 will be of a comparable magnitude, resulting in substantially the same heat exchange between the first fluid 24 and the second fluid 25 regardless of which layer 22 the pipe 17a-17n is a part of. By doing so, the pipe bundle 17 inside the container 11 can be adapted to fit the cross sectional shape of the container 11 and thereby fill out the cross sectional area of the container 11 to a higher degree, leading to an improved utilization of the volume of the container 11 as compared to a pipe bundle 17 arranged in layers 22 of equal width as exemplified in FIG. 3.

In general, it is to be understood that the present disclosure is not limited to the particular examples described above but may be adapted in a multitude of varieties within the scope of the present disclosure as specified in e.g. the claims. Accordingly, for example, one or more of the described and/or illustrated embodiments above may be combined to provide further embodiments of the present disclosure.

For example, In general, it is to be understood that even though the above mentioned heat exchanger solutions described in relation to for example FIGS. 2-14 and/or FIGS. 17-18 may be used in heat exchanger systems such as concentrated solar power plants as e.g. described in relation to one or more embodiments of for example FIG. 1, FIG. 1a, FIG. 15 and/or FIG. 16, it may also be used in other types of industrial applications.

For example, the heat transferring fluid, such as molten salt, thermal oil and/or any other suitable fluid for transferring heat through the walls pf the pipe bundle 17 inside the container 11 may be heated by any suitable source. This may e.g. include excess power, such as excess heat or excess electrical power, it may be heated by means of power provided by means other types of renewable energy sources such as wind energy, wave energy, hydropower (where e.g. water stored in an elevated position or is naturally flowing due to gravity, and is guided to flow through a turbine when there is a desire for electric power), it may be heated by means of biomass or any other suitable type of power source.

It is moreover understood that the system which the heat exchanger is to be used in may not necessarily generate electrical power by means of a turbine as described above. The system may also be used for other industrial process heating applications such as in production factories/facilities needing heating in an industrial scale for example food processing or for any other type of heating, it may be used in heating systems for larger greenhouse facilities where a heating by means of a heating system is used beyond the heating provided by the sun through the window panes of the green houses, it may be used in district heating systems for generating heat to be distributed in the district heating system to house holds and/or businesses and/or the like. The output from the heat exchanger, such as steam (or hot, liquid water) dependent on the application, may in embodiments of the present disclosure also be used for generating a combination of heat to be used in industrial heating applications, and electric power.

It is naturally to be understood that dependent on the application of the heat exchanger, the above mentioned examples of the pressure in the container of the heat exchanger and/or the temperature of the first and/or second fluids 24, 25 may vary and be adapted to the relevant use and system in which the heat exchanger 10 is to be installed.

It is generally understood that the above mentioned heat exchanger solutions described in relation to one or more of the FIGS. 1-18 may e.g. be especially suitable for heat exchangers configured to provide a thermal power above 5 MW thermal power, such as above 10 MW thermal power, for example above 20 MW thermal power or above 25 MW thermal power. The heat exchanger may in embodiments of the present disclosure be designed/configured to provide no more than max 600 MW thermal power, such as no more than 300 MW thermal power, for example no more than 200 MW thermal power or no more than 120 MW thermal power. This may be including heat loss in the heat exchanger, which, during operation may be no more than 2%. The thermal power may e.g. be determined by measuring the difference between the inlet and outlet temperature of the heat transferring fluid, and the amount of flow of the heat transferring fluid per time unit.

First Set of Points

A particular aspect of the present disclosure is detailed in the first set of points provided below and directed to a solar power plant for generating electric power. The heat exchanger (10) disclosed herein may be used in the solar power plant for an evaporator, an economizer, a super heater, and/or as a re-heater (first and/or further re-heater).

100. A solar power plant (1) for generating electric power, wherein said solar power plant (1) comprises:
an evaporator arrangement comprising an evaporator unit (10,110) configured to provide a phase transition of water (24, 25) from liquid state to steam by means of a first fluid (24, 25) by heat transfer from the first fluid (24, 25) through walls of pipes (17a-17n) of a pipe bundle (17),
an economizer (150) for pre-heating water before it enters the evaporator unit (110),
a super heater (120) arranged to receive said steam from the evaporator unit (110), to further heat the steam,
a steam turbine (140) configured to generate electric power by means of the further heated steam, and
a first re-heater (130) for reheating steam to be reintroduced to a steam turbine (140)
wherein the first re-heater (130) is arranged to receive the first fluid (24) before it enters the evaporator unit (110) to provide heat transfer from the first fluid to the steam, and
wherein said solar power plant comprises a flow splitting arrangement arranged to divide the first fluid (24) between the super heater (120) and said first re-heater (130), and wherein both the flow of first fluid (24) from the super heater (120) and the first re-heater (130) is configured to enter the evaporator unit after leaving the super heater (120) and the first re-heater (130).

101. A solar power plant according to point 100, wherein the first fluid (24) from the super heater (120) and the re-heater (130) is configured to be intermingled at a pipe connection positioned between outlets (120a, 130a) of the super heater (120) and the re-heater (130), and an inlet (110b) of the evaporator unit (110), before it enters the evaporator unit (110).

102. A solar power plant according to point 100 or 101, wherein said system is configured to provide a forced flow to the steam and/or water by means of a pumping arrangement.

103. A solar power plant according to any of points 100 to 102, wherein said economizer (150) is vertically displaced to a higher position than said super heater (120) and first re-heater (130).

104. A solar power plant according to any of points 100 to 103, wherein said economizer (150) is arranged at a level above the outlet (110a) of the evaporator unit (110) for the first fluid (24) so as to allow a drainage of the first fluid from the economizer, through the evaporator unit by means of gravity, wherein said evaporator unit preferably is vertically arranged.

105. A solar power plant according to any of points 100 to 104, wherein said first fluid (24) is molten salt or thermal oil.

106. A solar power plant according to any of points 100 to 105, wherein said evaporator arrangement (110) comprises a steam container (111) arranged to receive steam from the evaporator (110), preferably through one or more riser pipes connecting the evaporator unit (110) to the steam container (111).

107. A solar power plant according to any of points 100 to 106, wherein said first re-heater (130) is arranged to receive steam to be re-heated at an inlet (130y) from an outlet (140x1) of the steam turbine (140).

108. A solar power plant according to any of points 100 to 107, wherein said first re-heater (130) is arranged to receive steam from a further re-heater (131), wherein the further re-heater (131) is configured to re-heat steam from the steam turbine (140) by means of a flow of said first fluid (24) received from an outlet (110a) of the evaporator unit.

109. A solar power plant according to point 108, wherein said solar power plant comprises a flow splitting arrangement arranged to divide the first fluid (24) from an outlet (110a) of the evaporator unit (110) between the economizer (120) and said further re-heater (131).

110. A solar power plant according to according to point 108 or 109, wherein said economizer (120) and said further re-heater (131) is configured to provide heat transfer to water by means of first fluid (24) received from an outlet of the evaporator arrangement.

111. A solar power plant according to any of points 100 to 110, wherein the first fluid from the further re-heater and/or economizer is configured to be returned to be re-heated at a heating unit (101) arranged to be heated by the sun.

112. A solar power plant according to any of points 100 to 111, wherein the first fluid from the further re-heater (131) and/or economizer (150) is configured to be returned to be re-heated or to at a molten salt heat storage arrangement (220) comprising a first storage (221) and a second storage (222), wherein a heat exchanger (210, 10) is in fluid communication with the first and second molten salt storages (221, 222) and is configured to provide heat transfer to the first fluid (24) before the first fluid is re-introduced to the super heater (120) and first re-heater (130).

113. A solar power plant according to any of points 100 to 112, wherein the water and/or steam, after said reintroduction to the steam turbine (140), is returned to the evaporator unit, preferably after it is condensed in a condensing unit (160), and/or has been pre-heated in a pre-heater (150).

Second Set of Points

Another particular aspect of the present disclosure is detailed in the second set of points provided below and directed to a system for storing heat energy obtained by means of for example a solar power plant. The heat exchanger (10) disclosed herein may be used in the system.

200. A system (200) for storing heat energy, such as obtained by means of a solar power plant or another power source, and for collecting the stored heat energy to be used for generating steam, such as in a solar power plant or another system for generating steam, wherein said system comprises:

a heat exchanger (10, 210), wherein said heat exchanger (10) is a heat exchanger arranged to provide heat exchange between thermal oil (24) and molten salt when in liquid state, and a molten salt storage arrangement (220) comprising a first storage (221) and a second storage (222), wherein said heat exchanger (210, 10) is in fluid communication with the first and second molten salt storages (221, 222), wherein the system (200) comprises a pumping arrangement (230) configured to transfer molten salt between the first (221) and second (222) molten salt storages through said heat exchanger (210, 10), wherein said heat exchanger (10) is configured to be driven in a first and a second operating mode, wherein the first operating mode comprises that molten salt is transferred from the second molten salt storage (222) to the first molten salt storage (221) through said heat exchanger (210, 10) so as to provide a heat transfer from the thermal oil to the molten salt, wherein the second operating mode comprises that molten salt is transferred from the first molten salt storage (221) to the second molten salt storage (222) through said heat exchanger by means of said pumping arrangement so as to transfer heat energy to the thermal oil, wherein this thermal oil is arranged to be supplied to a steam generating system (1), such as of a solar power plant, wherein said heat exchanger comprises a pipe bundle (17) arranged inside a container (11) and extending between first and second pipe connectors (13, 14), where the pipe bundle (17) is connected to the first and second pipe connectors (13, 14) at pipe connection points (16) so the inside of the pipes (17a-17n) of the pipe bundle (17) is in fluid communication with cavities (15) of the first and second pipe connector (13, 14), wherein said heat exchanger (210, 10) is configured to provide a heat transfer between the molten salt (24) and thermal oil (25) through the pipe walls of the pipes (17a-17n) of the pipe bundle (17), wherein the pipes (17a-17n) of the pipe bundle (17) are arranged next to each other and extend together between the pipe connectors (13, 14) in a meandering manner providing a plurality of crests (20a, 20b) on the pipes (17a-17n) between the pipe connectors (13, 14), and so that crests (20) of pipes (17a-17n) of the pipe bundle (17) are arranged to extend into recesses (21) provided by one or more crests (20) on other pipes (17a-17n) of the pipe bundle (17).

201. A system according to point 200, wherein the pipes of the pipe bundle contain the thermal oil (24), and wherein the compartment (12) of the container (11) surrounding the pipes (17a-17n) of the pipe bundle (17) comprises the molten salt (226).

202. A system according to points 200 or 201, wherein a shift between the first and second operation modes is configured to be provided by shifting the pumping direction of the a pumping arrangement (230) and preferably controlling one or more valves (271-274) so as to alter the flow direction of thermal oil in the heat exchanger (10, 210).

We claim:

1. A heat exchanger for providing heat exchange between fluids in a solar power plant, wherein the heat exchanger comprises:

a container, wherein the container is configured to house a first fluid;

a first pipe connector and a second pipe connector, wherein each of the first pipe connector and the second pipe connector comprises:
a cavity; and
a plurality of pipe connection points; and a pipe bundle comprising pipes arranged inside the container and extending between the first pipe connector and the second pipe connector, wherein the pipes of the pipe bundle are configured to guide a second fluid, wherein the pipe bundle in the container is connected to the first pipe connector and the second pipe connector at the plurality of pipe connection points so each of the pipes of the pipe bundle has an inside that is in fluid communication with the cavity of the first pipe connector and the cavity of the second pipe connector, wherein the heat exchanger is configured to provide a heat transfer between the first fluid and the second fluid through pipe walls of the pipes of the pipe bundle, wherein the pipes of the pipe bundle are arranged next to each other and extend together between the first pipe connector and the second pipe connector in a meandering manner providing a plurality of crests on pipes between the first pipe connector and the second pipe connector, and so that crests of pipes of the pipe bundle are arranged to extend into recesses provided by one or more crests on other pipes of the pipe bundle, and wherein the pipe bundle comprises a plurality of layers of pipes distributed in a direction transverse to a longitudinal direction of the container, where each of the plurality of layers of pipe comprises pipes extending in the meandering manner, wherein each of the plurality of layers of pipes extend substantially in parallel to each other, and wherein each of the plurality of layers of pipes has a different width with remaining ones of the plurality of layers of pipes in a direction transverse to the longitudinal direction of the container, wherein layers of the plurality of layers of pipes of smaller width comprises fewer pipes than layers of the plurality of layers of pipes of larger width, and wherein each pipe in the layers of the plurality of layers of pipes of smaller width comprises a larger number of crests than each pipe in the layers of the plurality of layers of pipes of larger width.

2. The heat exchanger according to claim 1, wherein each of the widths of the plurality of layers of pipes fits within a cross-sectional shape of the container.

3. The heat exchanger according to claim 1, wherein the container has a substantially circular cross-sectional shape.

4. The heat exchanger according to claim 1, wherein a width of the layer of the plurality of layers of pipes having the smallest width is 80% or less than a width of the layer of the plurality of layers of pipes having the largest width.

5. The heat exchanger according to claim 1, wherein a number of pipes of the layer of the plurality of pipes having the smallest width is 80% or less than a number of pipes of the layer of the plurality of layers of pipes having the largest width.

6. The heat exchanger according to claim 1, wherein the first fluid is thermal oil or a molten salt, and/or wherein the second fluid is liquid water or steam.

7. The heat exchanger according to claim 1, wherein the pipe bundle is arranged inside a flow guiding enclosure in the container, wherein the flow guiding enclosure extends in the longitudinal direction of the container.

8. The heat exchanger according to claim 1, wherein the plurality of crests extend in a direction transverse to the longitudinal direction of the container.

9. The heat exchanger according to claim 1, wherein the pipes of the pipe bundle have an inner diameter between 13 mm and 38 mm.

10. The heat exchanger according to claim 1, wherein the heat exchanger is part of an evaporator unit configured to generate steam from the first fluid or the second fluid by providing a phase transition of the first fluid or the second fluid.

11. The heat exchanger according to claim 10, wherein the evaporator unit comprises the heat exchanger, and a steam container, wherein the steam container is in fluid communication with the heat exchanger of the evaporator unit so as to supply water to the heat exchanger, wherein the evaporator unit comprises an inlet for water, wherein the evaporator unit comprises a riser arrangement configured so that steam and/or water supplied to the evaporator unit and evaporated in the heat exchanger of the evaporator unit is circulated to the steam container, wherein the steam container comprises a steam outlet, and wherein the steam container comprises a separation arrangement for separating liquid from steam before the steam enters the outlet.

12. The heat exchanger according to claim 1, wherein the heat exchanger is a super heater for further heating steam received through an inlet of the super heater, where the steam is received from an evaporator unit.

13. The heat exchanger according to claim 1, wherein the heat exchanger is a re-heater arranged between an outlet of a steam turbine and before the second fluid is reintroduced to the steam turbine a second time before it is condensed by a condensing unit.

14. The heat exchanger according to claim 1, wherein the heat exchanger is a heat exchanger arranged to provide heat exchange between thermal oil and molten salt.

15. The heat exchanger according to claim 1, wherein the heat exchanger is a fluid/fluid heat exchanger arranged to provide heat transfer between thermal oil and molten salt.

16. The heat exchanger according to claim 1, wherein the heat exchanger is arranged to be utilized in two operating modes comprising:

a first operating mode where heat exchange is provided from thermal oil to molten salt by the heat exchanger so as to provide heat transfer to molten salt received from a second molten salt storage while moving the molten salt to a first molten salt storage; and a second operating mode wherein molten salt transfer stored heat energy from the first molten salt storage to the thermal oil is to be used in a steam generating system.

17. A method of use of a heat exchanger comprising:

a container, wherein the container is configured to house a first fluid;

a first pipe connector and a second pipe connector, wherein each of the first pipe connector and the second pipe connector comprises:

a cavity; and a plurality of pipe connection points; and a pipe bundle comprising pipes arranged inside the container and extending between the first pipe connector and the second pipe connector, wherein the pipes of the pipe bundle are configured to guide a second fluid, wherein the pipe bundle in the container is connected to the first pipe connector and the second pipe connector at the plurality of pipe connection points so each of the pipes of the pipe bundle has an inside that is in fluid communication with the cavity of the first pipe connector and the cavity of the second pipe connector, wherein the heat exchanger is configured to provide a heat transfer between the first fluid and the second fluid through pipe walls of the pipes of the pipe bundle, wherein the pipes of the pipe bundle are arranged next to each other and extend together between the first pipe connector and the second pipe connector in a meandering manner providing a plurality of crests on pipes between the first pipe connector and the second pipe connector, and so that crests of pipes of the pipe bundle are arranged to extend into recesses provided by one or more crests on other pipes of the pipe bundle, and wherein the pipe bundle comprises a plurality of layers of pipes distributed in a direction transverse to a longitudinal direction of the container, where each of the plurality of layers of pipe comprises pipes extending in the meandering manner, wherein each of the plurality of layers of pipes extend substantially in parallel to each other, and wherein each of the plurality of layers of pipes has a different width with remaining ones of the plurality of layers of pipes in a direction transverse to the longitudinal direction of the container, wherein the layers of the plurality of layers of pipes of smaller width comprises fewer pipes than layers of the plurality of layers of pipes of larger width, and wherein each pipe in the layers of the plurality of layers of pipes of smaller width comprises a larger number of crests than each pipe in the layers of the plurality of layers of pipes of larger width;

the method of use comprising having the heat exchanger provide above 5 MW thermal power.

18. The method of use of a heat exchanger according to claim 17, wherein the heat exchanger provides no more than 600 MW thermal power.

19. A method of use of a heat exchanger comprising:
a container, wherein the container is configured to house a first fluid;
a first pipe connector and a second pipe connector, wherein each of the first pipe connector and the second pipe connector comprises:
  a cavity; and
  a plurality of pipe connection points; and
a pipe bundle comprising pipes arranged inside the container and extending between the first pipe connector and the second pipe connector, wherein the pipes of the pipe bundle are configured to guide a second fluid, wherein the pipe bundle in the container is connected to the first pipe connector and the second pipe connector at the plurality of pipe connection points so each of the pipes of the pipe bundle has an inside that is in fluid communication with the cavity of the first pipe connector and the cavity of the second pipe connector, wherein the heat exchanger is configured to provide a heat transfer between the first fluid and the second fluid through pipe walls of the pipes of the pipe bundle, wherein the pipes of the pipe bundle are arranged next to each other and extend together between the first pipe connector and the second pipe connector in a meandering manner providing a plurality of crests on pipes between the first pipe connector and the second pipe connector, and so that crests of pipes of the pipe bundle are arranged to extend into recesses provided by one or more crests on other pipes of the pipe bundle, and wherein the pipe bundle comprises a plurality of layers of pipes distributed in a direction transverse to a longitudinal direction of the container, where each of the plurality of layers of pipe comprises pipes extending in the meandering manner, wherein each of the plurality of layers of pipes extend substantially in parallel to each other, and wherein each of the plurality of layers of pipes has a different width with remaining ones of the plurality of layers of pipes in a direction transverse to the longitudinal direction of the container, wherein layers of the plurality of layers of pipes of smaller width comprises fewer pipes than layers of the plurality of layers of pipes of larger width, and wherein each pipe in the layers of the plurality of layers of pipes of smaller width comprises a larger number of crests than each pipe in the layers of the plurality of layers of pipes of larger width;

the method of use comprising using the heat exchanger in a solar power plant and/or for providing industrial heat.

* * * * *